(12) United States Patent
Chujoh et al.

(10) Patent No.: US 11,197,014 B2
(45) Date of Patent: Dec. 7, 2021

(54) ENCODING APPARATUS, DECODING APPARATUS, AND IMAGE PROCESSING SYSTEM

(71) Applicant: Kabushiki Kaisha Toshiba, Minato-ku (JP)

(72) Inventors: Takeshi Chujoh, Kawasaki (JP); Shunichi Gondo, Ota (JP); Mika Minematsu, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/438,169

(22) Filed: Feb. 21, 2017

(65) Prior Publication Data

US 2018/0070098 A1  Mar. 8, 2018

(30) Foreign Application Priority Data

Sep. 6, 2016  (JP) .............................. JP2016-174043

(51) Int. Cl.
| | |
|---|---|
| *H04N 19/503* | (2014.01) |
| *H04N 19/577* | (2014.01) |
| *H04N 19/107* | (2014.01) |
| *H04N 19/154* | (2014.01) |
| *H04N 19/105* | (2014.01) |
| *H04N 19/172* | (2014.01) |

(52) U.S. Cl.
CPC ......... *H04N 19/503* (2014.11); *H04N 19/105* (2014.11); *H04N 19/107* (2014.11); *H04N 19/154* (2014.11); *H04N 19/172* (2014.11); *H04N 19/577* (2014.11)

(58) Field of Classification Search
None
See application file for complete search history.

(56) References Cited

U.S. PATENT DOCUMENTS

| | | | | |
|---|---|---|---|---|
| 6,021,199 A | * | 2/2000 | Ishibashi .......... | G11B 20/00086 375/E7.211 |
| 2002/0061184 A1 | * | 5/2002 | Miyamoto ........... | H04N 19/154 386/232 |
| 2002/0075400 A1 | * | 6/2002 | Shin ..................... | H04N 7/0112 348/441 |

(Continued)

FOREIGN PATENT DOCUMENTS

| | | |
|---|---|---|
| JP | 7-184206 | 7/1995 |
| JP | 10-23423 | 1/1998 |

(Continued)

*Primary Examiner* — Frederick D Bailey
(74) *Attorney, Agent, or Firm* — Oblon, McClelland, Maier & Neustadt, L.L.P.

(57) ABSTRACT

An encoding apparatus according to an embodiment includes a specifying unit, a first encoder and a second encoder. The specifying unit specifies a first original image signal included in an original image signal. The first encoder generates base image encoded data obtained by encoding the first original image signal by inter-frame prediction using a reference image signal. The second encoder generates standard encoded data obtained by encoding a second original image signal serving as the original image signal other than the first original image signal by the inter-frame prediction based on the base image encoded data.

11 Claims, 11 Drawing Sheets

(56) References Cited

U.S. PATENT DOCUMENTS

| | | | | |
|---|---|---|---|---|
| 2004/0252765 A1* | 12/2004 | Hosoda | ................ | H04N 5/4448 |
| | | | | 375/240.16 |
| 2005/0117643 A1* | 6/2005 | Hatabu | ............ | H04N 21/25808 |
| | | | | 375/240.12 |
| 2006/0002470 A1* | 1/2006 | Sakurai | .................. | H04N 5/145 |
| | | | | 375/240.12 |
| 2010/0272174 A1* | 10/2010 | Toma | .................. | H04N 19/105 |
| | | | | 375/240.12 |
| 2011/0221927 A1* | 9/2011 | Takagi | ................... | G11B 27/28 |
| | | | | 348/222.1 |
| 2011/0222605 A1* | 9/2011 | Kashiwagi | ........... | H04N 19/597 |
| | | | | 375/240.16 |
| 2012/0195370 A1* | 8/2012 | Guerrero | ............. | H04N 19/124 |
| | | | | 375/240.02 |
| 2014/0118544 A1* | 5/2014 | Asaka | .................. | G06T 7/0002 |
| | | | | 348/143 |
| 2015/0078436 A1* | 3/2015 | Chujoh | .................... | H04N 1/44 |
| | | | | 375/240.02 |
| 2016/0021391 A1* | 1/2016 | Su | ......................... | H04N 19/30 |
| | | | | 375/240.12 |
| 2016/0142715 A1 | 5/2016 | Tanizawa et al. | | |
| 2016/0381319 A1* | 12/2016 | Nakajima | .............. | H04N 5/225 |
| | | | | 348/231.99 |
| 2017/0078355 A1 | 3/2017 | Gondo et al. | | |

FOREIGN PATENT DOCUMENTS

| | | |
|---|---|---|
| JP | 2008-187753 | 8/2008 |
| JP | 2014-92875 | 5/2014 |
| JP | 2015-61197 | 3/2015 |
| JP | 2016-96502 | 5/2016 |
| JP | 2017-60004 A | 3/2017 |

\* cited by examiner

| TYPE OF ORIGINAL IMAGE SIGNAL | REFERENCE IMAGE SIGNAL ID | REFERENCE IMAGE SIGNAL |
|---|---|---|
| SHOT IMAGE | 0001 | (OMITTED) |
| | 0002 | (OMITTED) |
| | 0003 | (OMITTED) |
| | 0004 | (OMITTED) |
| ⋮ | ⋮ | ⋮ |

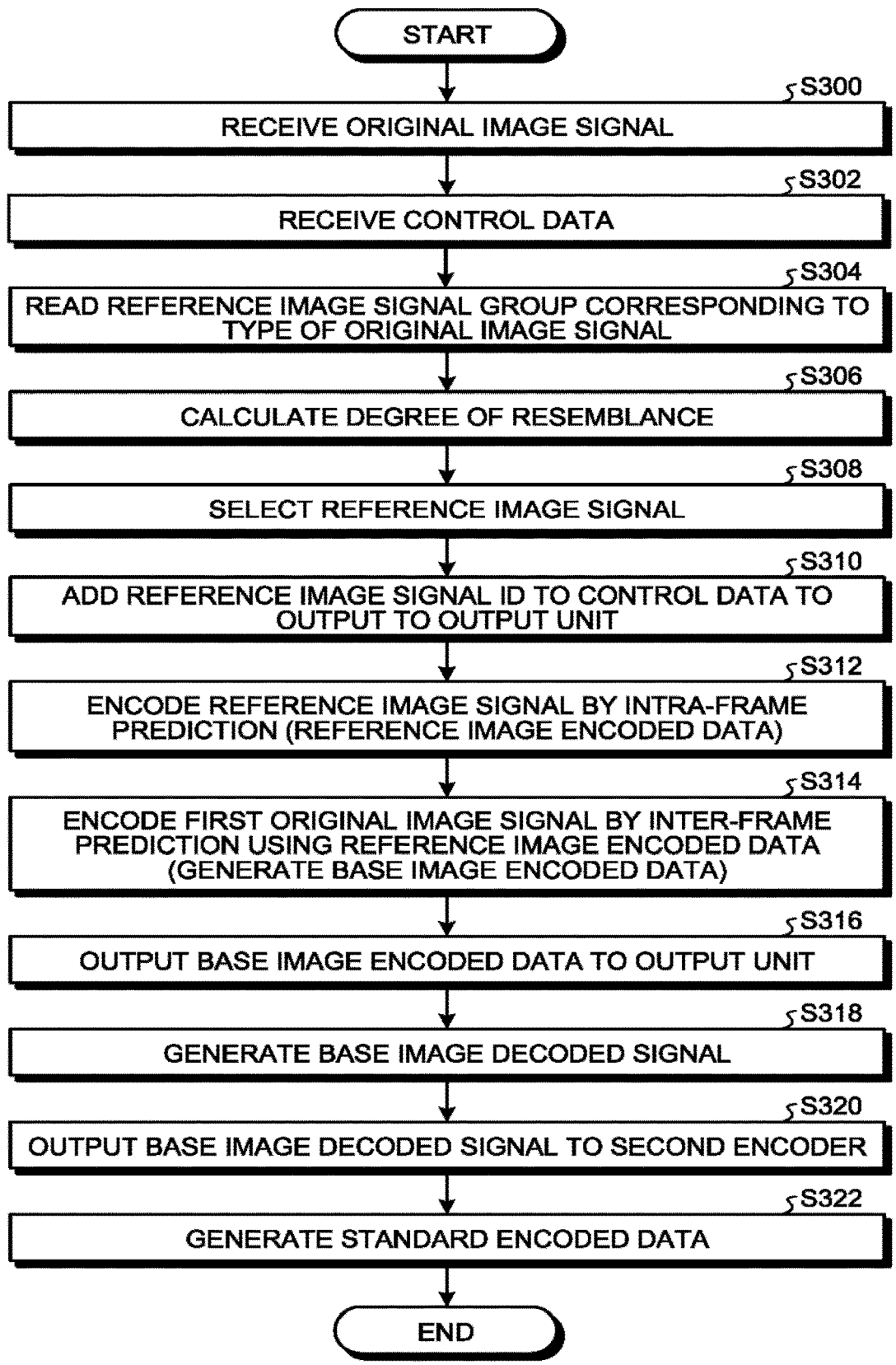

ENCODING APPARATUS, DECODING APPARATUS, AND IMAGE PROCESSING SYSTEM

CROSS-REFERENCE TO RELATED APPLICATIONS

This application is based upon and claims the benefit of priority from Japanese Patent Application No. 2016-174043, filed on Sep. 6, 2016; the entire contents of which are incorporated herein by reference.

FIELD

Embodiments described herein relate generally to an encoding apparatus, a decoding apparatus, and an image processing system.

BACKGROUND

Image transmission typically uses a method that achieves efficient encoding by predicting a current image from an image encoded in the past. However, moving image encoding is usually required to insert a screen encoded by intra-frame prediction for a scene change or random access. Data encoded by the intra-frame prediction is concluded within a screen and thus involves a larger amount of encoding than data encoded by inter-frame prediction that makes temporal prediction. This has consequently caused degradation of overall encoding efficiency and transmission delay. In particular, a surveillance video captured with a fixed camera or screen content has a large difference in the amount of encoding between data subjected to the intra-frame encoding and data subjected to the inter-frame encoding. For this reason, there has been a problem of extremely increased bit rate on the whole.

Meanwhile, when the compatibility with an existing system is considered, there is such a demand for using a standard technique rather than a special technique such as separate encoding of a background when delivered. A method that carries out re-encoding at a reproducing side is disclosed for a case where a storing medium such as a hard disk or an optical disc is used. For example, a method is known in which data encoded by the inter-frame prediction is decoded once and thereafter, re-encoded by the intra-frame prediction encoding; then, an interval to a subsequent frame that can accept random access is re-encoded between frames.

However, the conventional method decodes the data encoded by the inter-frame prediction once at a reproducing side to re-encode later through the intra-frame prediction encoding. Therefore, the conventional method has had a problem in which random access with low delay cannot be implemented even though it is required in network transmission, broadcasting, and so on. The conventional method also has had the problem of the degradation of the image quality due to the re-encoding between frames carried out on an interval to a subsequent frame that can accept random access. Consequently, it has been difficult in the past to provide encoded data that enables image transmission with high quality and low delay and also is capable of accepting random access.

BRIEF DESCRIPTION OF THE DRAWINGS

FIG. 2 is a schematic diagram illustrating a data configuration of a reference image management DB;

FIG. 6 is a flowchart illustrating procedures of processing carried out by the first encoder and a second encoder;

DETAILED DESCRIPTION

An encoding apparatus according to an embodiment includes a specifying unit, a first encoder and a second encoder. The specifying unit specifies a first original image signal included in an original image signal. The first encoder generates base image encoded data obtained by encoding the first original image signal by inter-frame prediction using a reference image signal. The second encoder generates standard encoded data obtained by encoding a second original image signal serving as the original image signal other than the first original image signal by the inter-frame prediction based on the base image encoded data.

First Embodiment

Image Processing System

Figure 1:
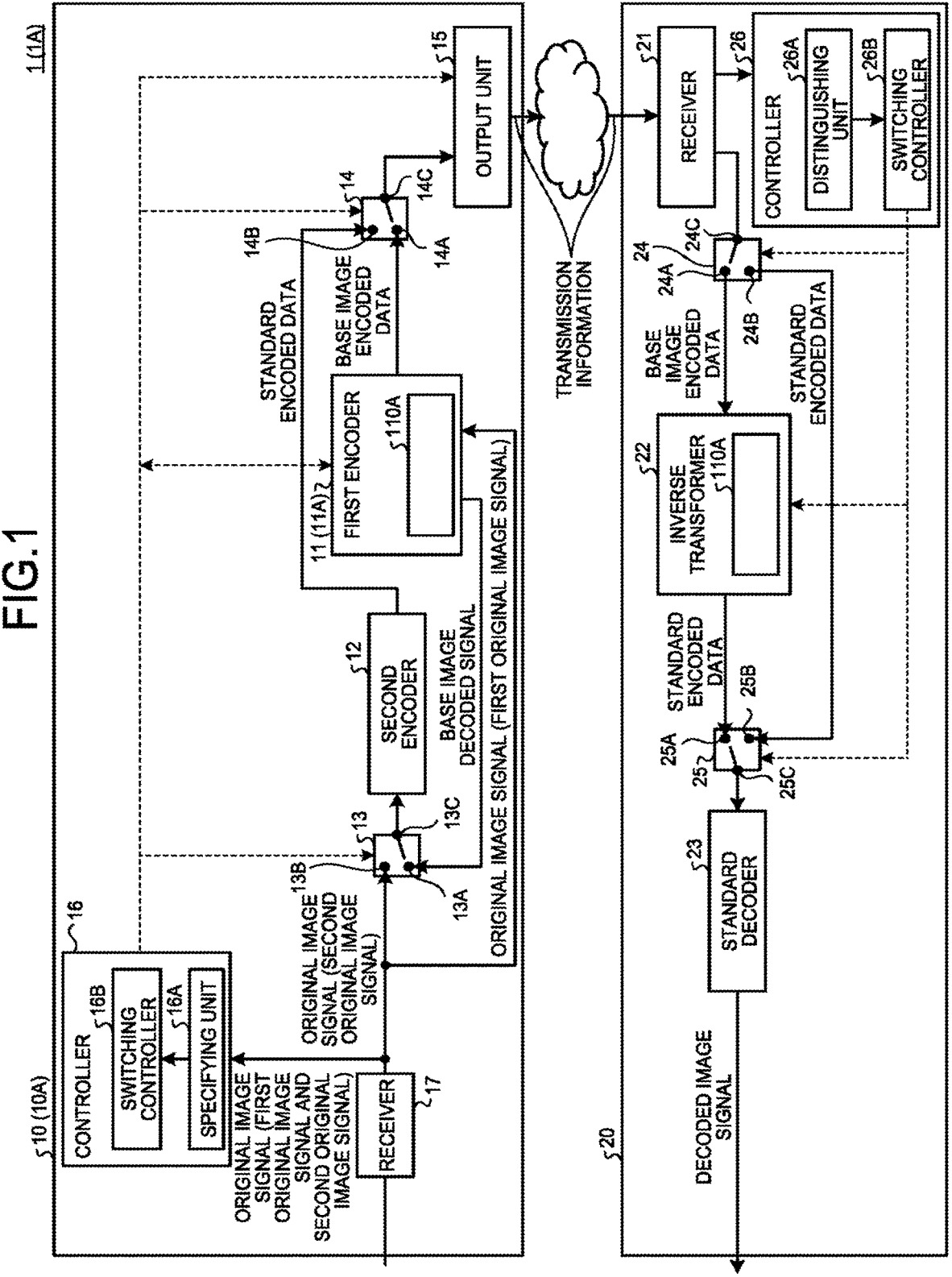
FIG. 1 is a schematic diagram illustrating a functional configuration of an image processing system.

FIG. 1 is a schematic diagram illustrating an exemplary functional configuration of an image processing system 1 according to the present embodiment.

The image processing system 1 includes an encoding apparatus 10 and a decoding apparatus 20. The encoding apparatus 10 and the decoding apparatus 20 are able to be connected to each other via a communication line 19.

The communication line 19 is a publicly known communication line. The communication line 19 may be a wired communication network, or alternatively, a wireless communication network. For example, a local area network (LAN) is used for the communication line 19 and a communication protocol such as Ethernet (registered trademark) or TCP/IP is utilized therein. The communication line 19 is, for example, the Internet and utilizes a communication protocol such as Ethernet or TCP/IP.

Note that the encoding apparatus 10 and the decoding apparatus 20 are only required to be connectable to each other such that data or a signal can be received from and transmitted to each other via the communication line 19. Accordingly, the encoding apparatus 10 and the decoding apparatus 20 are not limited to a form of being constantly connected. Meanwhile, the encoding apparatus 10 and the decoding apparatus 20 may be configured such that data or a signal can be received from and transmitted to each other via a storage medium. In other words, data or a signal output from the encoding apparatus 10 may be stored to the storage medium. Thereafter, the decoding apparatus 20 may read the data or the signal from this storage medium.

Encoding Apparatus

First, the encoding apparatus 10 will be described.

The encoding apparatus 10 includes a first encoder 11, a second encoder 12, a switch 13, a switch 14, an output unit 15, a controller 16, and a receiver 17.

Note that, although FIG. 1 mainly exemplifies functions relating to the embodiment, the functions included in the encoding apparatus 10 are not limited thereto. These respective processing functions will be described later.

Part or all of the first encoder 11, the second encoder 12, the switch 13, the switch 14, the output unit 15, the controller 16, and the receiver 17 may be implemented by, for example, causing a processing apparatus such as a central processing unit (CPU) to execute a program, namely, by software, or may be implemented by hardware such as an integrated circuit (IC), or alternatively, may be implemented by a combination of software and hardware.

For example, each of the functions of the encoding apparatus 10 is stored in a storage circuit in a form of a program executable by a computer. The encoding apparatus 10 is a processor that implements a function corresponding to each of the programs by reading the program from the storage circuit to execute. Thus, after reading the individual program, the encoding apparatus 10 is supposed to have each of the functions illustrated within the encoding apparatus 10 in FIG. 1. In addition, FIG. 1 has illustrated a case where the first encoder 11, the second encoder 12, the switch 13, the switch 14, the output unit 15, the controller 16, and the receiver 17 are implemented by a single processing circuit. However, the encoding apparatus 10 may be constituted by combining a plurality of independent processors such that the functions are implemented by the respective processors through the execution of the programs. There may be a case where each of the processing functions is configured as a program such that a single processing circuit executes each of the programs, or alternatively, there may be a case where a specific function is implemented in a dedicated independent program execution circuit.

Note that the term "processor" used in the description above refers to, for example, a CPU, a graphical processing unit (GPU), an application specific integrated circuit (ASIC), or a circuit of a programmable logic device (e.g., a simple programmable logic device (SPLD), a complex programmable logic device (CPLD), and a field programmable gate array (FPGA)). The processor reads the program saved in the storage circuit to execute, thereby implementing the function. In addition, the processor may be configured such that the program is directly built into a circuit thereof instead of saving the program in the storage circuit. In this case, the processor reads the program built in the circuit thereof to execute, thereby implementing the function.

The encoding apparatus 10 is an apparatus that encodes an original image signal. The receiver 17 receives the original image signal from the outside. The receiver 17 receives the original image signal via a publicly known communication line. In addition, the receiver 17 may read the original image signal from the storage circuit. The receiver 17 outputs the received original image signal to the controller 16, the switch 13, and the first encoder 11.

The original image signal is moving image data containing a plurality of frames. In the following description, the frame is referred to as image signal. Additionally, in the embodiment, "signal" represents, for example, an image before encoding such as the frame and an image obtained by decoding data that has been encoded. The original image signal, a first original image signal, a second original image signal, the image signal, a base image decoded signal, a reference image signal, and so on are used as the signals in the embodiment. Details of these signals will be described later. In addition, "encoded data" according to the embodiment refers to data obtained after encoding. Standard encoded data, base image encoded data, reference image encoded data, and so on are used as the encoded data in the embodiment. Details of these items of data will be described later.

In the embodiment, the receiver 17 outputs, to each of the controller 16 and the second encoder 12 or the first encoder 11, the plurality of consecutive image signals in the time series included in the original image signal in the order of the encoding from the image signals. Accordingly, the controller 16, the second encoder 12, and the first encoder 11 carry out processing described later for each of the image signals.

The switch 13 switches a connection state of the second encoder 12 on an input side to a state where the receiver 17 and the second encoder 12 are connected or a state where the first encoder 11 and the second encoder 12 are connected. Note that, while the first encoder 11 and the second encoder 12 are connected, the connection between the receiver 17 and the second encoder 12 is cancelled and the receiver 17 and the first encoder 11 are in a state of being connected to each other.

The switch 13 includes a first connection terminal 13A, a second connection terminal 13B, and a connection terminal 13C. The first connection terminal 13A is connected to the first encoder 11. The second connection terminal 13B is connected to the receiver 17. The connection terminal 13C is connected to the second encoder 12.

The switch 13 is switched to any one of a state where the connection terminal 13C and the first connection terminal 13A are connected and a state where the connection terminal 13C and the second connection terminal 13B are connected. The controller 16 controls the switching of the connection state at the switch 13 (details will be described later).

While the switch 13 is in a state where the connection terminal 13C and the second connection terminal 13B are connected, the receiver 17 and the second encoder 12 are in a state of being connected to each other. In this case, the receiver 17 outputs the image signal included in the original image signal to the second encoder 12.

Compared to this, while the switch 13 is in a state where the connection terminal 13C and the first connection terminal 13A are connected, the second encoder 12 and the first encoder 11 are in a state of being connected to each other. In addition, the receiver 17 and the second encoder 12 are in a state where the connection therebetween is cancelled. In addition, the receiver 17 and the first encoder 11 are in a state of being connected to each other.

In this case, the receiver 17 outputs the image signal included in the original image signal to the first encoder 11. Additionally, in this case, the first encoder 11 and the second encoder 12 are in a state of being connected to each other via the switch 13 (first connection terminal 13A and the connection terminal 13C). Accordingly, the second encoder 12 is in a state of being able to receive the base image decoded signal (details will be described later) output from the first encoder 11 via the switch 13.

The switch 14 switches the connection state of the output unit 15 on an input side.

The switch 14 includes a first connection terminal 14A, a second connection terminal 14B, and a connection terminal 14C. The first connection terminal 14A is connected to the first encoder 11. The second connection terminal 14B is connected to the second encoder 12. The connection terminal 14C is connected to the output unit 15.

The switch 14 is switched to any one of a state where the connection terminal 14C and the first connection terminal 14A are connected and a state where the connection terminal 14C and the second connection terminal 14B are connected. The controller 16 controls the switching of the connection state at the switch 14 (details will be described later).

While the switch 14 is in a state where the connection terminal 14C and the second connection terminal 14B are connected, the second encoder 12 and the output unit 15 are in a state of being connected to each other via the switch 14. In this case, the output unit 15 is in a state of being able to receive the signal output from the second encoder 12 via the switch 14.

On the other hand, while the switch 14 is in a state where the connection terminal 14C and the first connection terminal 14A are connected, the first encoder 11 and the output unit 15 are in a state of being connected to each other via the switch 14. In this case, the output unit 15 is in a state of being able to receive the signal output from the first encoder 11 via the switch 14.

The controller 16 controls the first encoder 11, the second encoder 12, the switch 13, the switch 14, and the output unit 15 on the basis of the original image signal received from the receiver 17.

The controller 16 according to the embodiment includes a specifying unit 16A and a switching controller 16B. The specifying unit 16A specifies the first original image signal from among the image signals included in the original image signal received at the receiver 17. In the embodiment, the specifying unit 16A receives the plurality of image signals constituting the original image signal in the order from a top image signal. Thereafter, the specifying unit 16A distinguishes whether the received image signal is the first original image signal every time the image signal is received. As a consequence, the specifying unit 16A specifies the first original image signal.

Note that the specifying unit 16A may receive at least part of the plurality of image signals included in the original image signal so as to specify the first original image signal from among the plurality of received image signals.

The first original image signal is an image signal to be encoded at the first encoder 11. The first original image signal is an image signal serving as a starting point at the time of the reproduction of a moving image. The original image signal includes the one or the plurality of first original image signals. The first original image signal according to the embodiment represents a signal indicating a transition of a scene or an image signal used as a random access point.

By using a publicly known method, the specifying unit 16A distinguishes whether the image signal received from the receiver 17 is an image signal indicating a transition of a scene. For example, the specifying unit 16A detects a difference in correlation between the image signal received from the receiver 17 and another image signal just previously received. Thereafter, by using this detection result, the specifying unit 16A distinguishes, through a publicly known method, whether the image signal received from the receiver 17 is an image signal indicating a transition of a scene.

By using a publicly known method, the specifying unit 16A also distinguishes whether the image signal received from the receiver 17 is an image signal used as a random access point. The image signal used as a random access point represents an image signal with a possibility of being specified as a reproduction start point when reproduced. For example, the specifying unit 16A can use the number of the image signals (the number of the frames) included in the original image signal or a counter for the number of fields when distinguishing whether the received image signal is the image signal used as a random access point through a publicly known method.

The switching controller 16B controls the switching at the switch 13 and the switch 14 on the basis of a specifying result by the specifying unit 16A.

When the specifying unit 16A distinguishes that the image signal to be processed is the first original image signal, the switching controller 16B carries out the switching control to activate the first encoder 11.

The switching control to activate the first encoder 11 means controlling the switch 13 such that the first encoder 11 and the second encoder 12 are connected, while controlling the switch 14 such that the first encoder 11 and the output unit 15 are connected. In detail, in this case, the switching controller 16B controls the switch 13 such that the first connection terminal 13A and the connection terminal 13C are connected. The switching controller 16B also controls the switch 14 such that the first connection terminal 14A and the connection terminal 14C are connected.

Accordingly, when the switching controller 16B controls the switching at the switch 13 and the switch 14 to activate the first encoder 11, each pair of the receiver 17 and the first encoder 11, the first encoder 11 and the output unit 15, and the first encoder 11 and the second encoder 12 is put into a state of being connected to each other.

In this case, the first original image signal output from the receiver 17 is output to the first encoder 11. Thereafter, the first encoder 11 carries out processing described later on the received first original image signal. In addition, in this case, the second encoder 12 is put into a state of being able to receive the base image decoded signal output from the first encoder 11. As for the base image decoded signal, details will be described later.

Furthermore, in this case, the switching controller 16B outputs, to the first encoder 11, control data including image signal identification information that identifies the image signal to be processed (hereinafter, referred to as image signal ID) and type information.

The type information is information indicating a type of the image signal to be processed. The type information is any one of first type information indicating that the first original image signal is involved and second type information indicating that the second original image signal is involved. When it is distinguished that the image signal to be processed is the first original image signal, the specifying unit 16A outputs the control data including the first type information to the first encoder 11 as the type information.

On the other hand, when the specifying unit 16A distinguishes that the image signal to be processed is the second original image signal, the switching controller 16B carries out the switching control to activate the second encoder 12. The switching control to activate the second encoder 12 means controlling the switch 13 such that the receiver 17 and the second encoder 12 are connected, while controlling the switch 14 such that the second encoder 12 and the output unit 15 are connected. In detail, in this case, the switching controller 16B controls the switch 13 such that the second connection terminal 13B and the connection terminal 13C are connected. The switching controller 16B also controls the switch 14 such that the second connection terminal 14B and the connection terminal 14C are connected.

Accordingly, when the switching controller 16B controls the switching at the switch 13 and the switch 14 to activate the second encoder 12, each pair of the receiver 17 and the second encoder 12 and the second encoder 12 and the output unit 15 is put into a state of being connected to each other.

As a consequence, the second original image signal output from the receiver 17 is output to the second encoder 12 in this case. The second encoder 12 uses the second original image signal received from the receiver 17 and the base image decoded signal received from the first encoder 11 for the last time to carry out processing described later.

Furthermore, in this case, the switching controller 16B outputs, to the second encoder 12, the control data including the image signal ID of the image signal to be processed and the type information thereon. The type information in this case is the second type information indicating that the second original image signal is involved.

Next, the first encoder 11 will be described.

The first encoder 11 encodes the first original image signal by inter-frame prediction using the reference image signal, thereby generating the base image encoded data.

As described above, in a case where the image signal output from the receiver 17 is the first original image signal, the switch 13 has been put into a state, by the switching controller 16B, where each pair of the receiver 17 and the first encoder 11 and the first encoder 11 and the second encoder 12 are connected. In addition, the switch 13 has been put into a state where the connection between the receiver 17 and the second encoder 12 is cancelled.

Accordingly, the first original image signal output from the receiver 17 is output to the first encoder 11. The first encoder 11 encodes the first original image signal received from the receiver 17 by the inter-frame prediction using the reference image signal.

The reference image signal is an image used in the inter-frame prediction encoding of the first original image signal. The reference image signal is an image resembling the first original image signal. Resembling the first original image signal means that an image displayed in at least part of an image area within the image signal resembles the first original image signal. In other words, resembling the first original image signal means that an image in an image area which is constant regardless of elapsed time included in the first original image signal resembles the first original image signal. For example, in a case where a moving object is included in a photographic angle of view, the constant area is an area other than the moving object in the photographic angle of view. The moving object is an object capable of moving. The constant area is referred to as background area in some cases.

The first encoder 11 according to the embodiment stores the plurality of reference image signals in advance for each of the types of the original image signals.

The types of the original image signals are obtained through the categorization of the original image signals depending on scenes in which the original image signals are utilized. Examples of the types of the original image signals include a shot image taken with a camera and display screen data of a display screen appearing on a display unit. The display unit is a publicly known display such as a liquid crystal display or an organic electro-luminescence display. In a case where the type of the original image signal is "display screen data", the original image signal includes a group of the display screens appearing on the display unit as a group of the image signals.

In a case where the type of the original image signal is "shot image", the original image signal includes a group of the shot images taken with a camera or the like as a group of the image signals.

Specifically, the plurality of reference image signals corresponding to the type of the original image signal of "shot image" is images having the same shooting locations and photographic angles of view, while having at least one of shooting timings or illumination conditions different from one another. Meanwhile, the plurality of reference image signals corresponding to the type of the original image signal of "display screen data" is template screens prepared in advance as display screens.

The first encoder 11 according to the embodiment stores a reference image management DB 110A in advance. The reference image management DB 110A is a database for managing the reference image signals. Note that the data format of the reference image management DB 110A is not limited to the database.

FIG. 2 is a schematic diagram illustrating an exemplary data configuration of the reference image management DB 110A. The reference image management DB 110A is configured by associating the type of the original image signal, a reference image signal ID, and the reference image signal with one another. The reference image signal ID is identification information for identifying the corresponding reference image signal. As illustrated in FIG. 2, the plurality of reference image signals is registered for one type of the original image signal in advance in the reference image management DB 110A.

Note that the reference image management DB 110A may be configured to be able to be modified as appropriate through, for example, an operation instruction by a user.

In addition, the reference image signal stored in the reference image management DB 110A may be encoded by intra-frame prediction at high image quality, or alternatively, may not be encoded data, but, namely, so-called raw data. For the description, it is assumed in the embodiment that the reference image signal in a state of the raw data is registered in the reference image management DB 110A.

The description will be continued by referring back to FIG. 1. The first encoder 11 encodes the first original image signal by the inter-frame prediction using the reference image signal, thereby generating the base image encoded data. In other words, the base image encoded data is data generated through the inter-frame prediction encoding of the first original image signal using the reference image signal.

Figure 3:
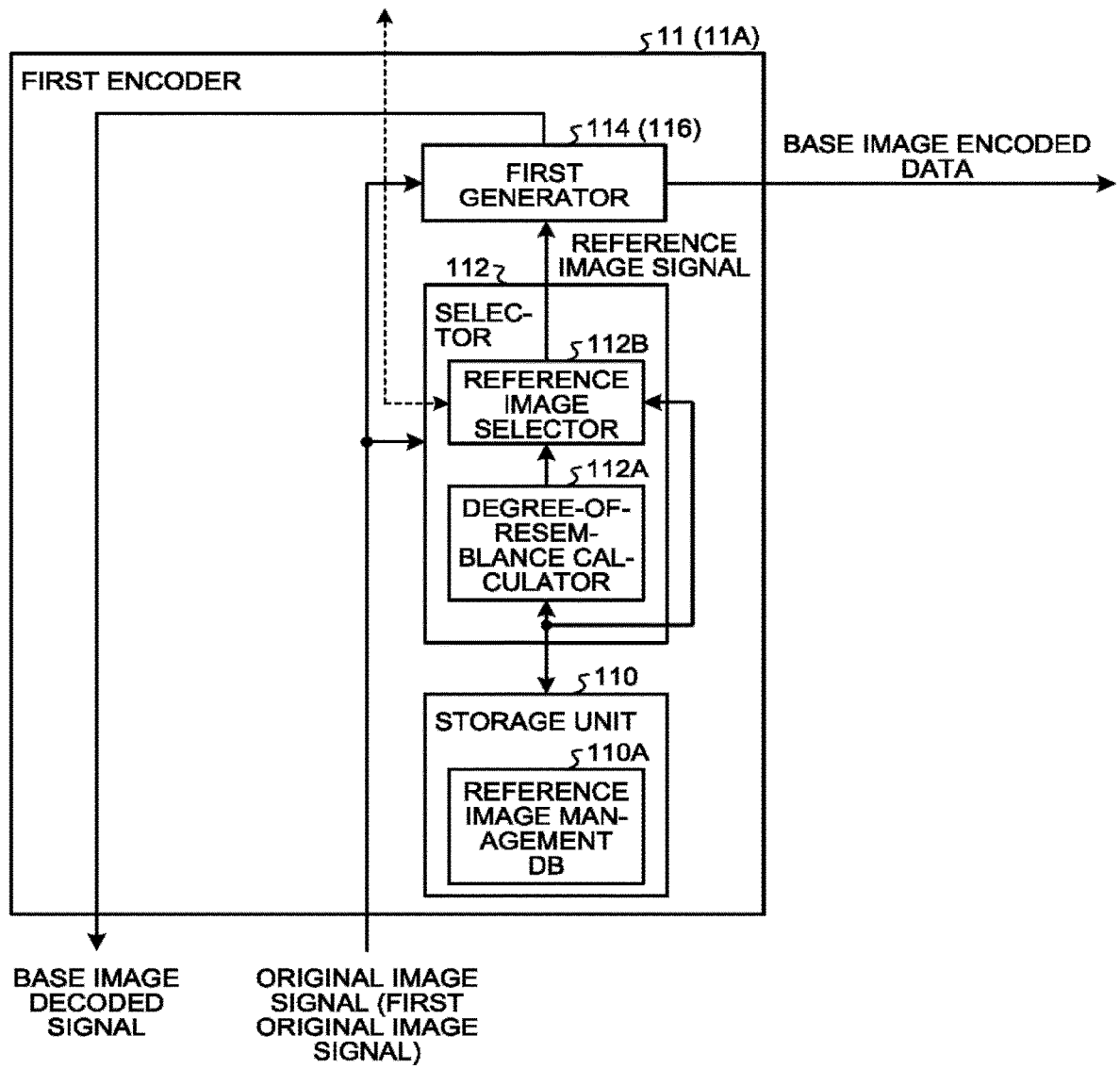
FIG. 3 is a schematic diagram illustrating a first encoder.

FIG. 3 is a schematic diagram illustrating the exemplary first encoder 11. The first encoder 11 includes a storage unit 110, a selector 112, and a first generator 114.

The storage unit 110 stores the reference image management DB 110A in advance.

The selector 112 receives the first original image signal from the receiver 17. The selector 112 also receives the control data from the controller 16. The selector 112 selects, from the storage unit 110, the reference image signal of which the degree of resemblance to the received first original image signal is equal to or higher than a threshold. The selector 112 according to the embodiment selects the reference image signal having the degree of resemblance equal to or higher than the threshold from among the reference image signals corresponding to the type of the original image signal. The selector 112 may select one reference image signal, or alternatively, may select the plurality of reference image signals.

In detail, the selector 112 includes a degree-of-resemblance calculator 112A and a reference image selector 112B.

The degree-of-resemblance calculator 112A calculates the degree of resemblance between the first original image signal and the reference image signal. First, the degree-of-resemblance calculator 112A reads, from the reference image management DB 110A (see FIG. 2) in the storage unit 110, the plurality of reference image signals (referred to as reference image signal group in some cases) corresponding to the type of the original image signal including the received first original image signal.

The degree-of-resemblance calculator 112A can specify the type of the original image signal by reading the type of the original image signal included in the control data received from the controller 16. In this case, the control data is only required to be data containing the type of the original image signal.

For example, the receiver 17 specifies the type of the received original image signal (see FIG. 1). The receiver 17 may specify the type of the original image signal, for example, by reading header information of the original image signal or through image analysis on the original image signal. Thereafter, the receiver 17 outputs the image signal and the type of the original image signal to the controller 16. When it is distinguished that the received image signal is the first original image signal, the controller 16 outputs the control data including the type of the original image signal, the image signal ID, and the first type information to the first encoder 11. Thus, the degree-of-resemblance calculator 112A of the first encoder 11 may specify the type of the original image signal by reading the type of the original image signal included in the control data.

Subsequently, the degree-of-resemblance calculator 112A reads the plurality of reference image signals corresponding to the specified original image signal from the reference image management DB 110A. The degree-of-resemblance calculator 112A calculates the degree of resemblance between the first original image signal and each of the plurality of read reference image signals. A publicly known image processing method may be used in the calculation of the degree of resemblance. In addition, an arbitrary value may be set as the threshold used in the selection of the reference image signal. A value in accordance with the type of the original image signal may be set in advance for this threshold as well. Furthermore, this threshold may be configured to be able to be modified as appropriate through, for example, an operation instruction by a user.

The reference image selector 112B selects the reference image signal having the degree of resemblance to the first original image signal equal to or higher than the threshold from among the reference image signals corresponding to the type of the original image signal. As for the number of the reference image signals selected by the reference image selector 112B, the one reference image signal or the plurality of reference image signals may be employed.

Thereafter, the selector 112 outputs the selected reference image signal to the first generator 114. The selector 112 also outputs the reference image signal ID of the selected reference image signal to the output unit 15. In detail, the selector 112 adds the reference image signal ID to the control data received from the controller 16 to output to the output unit 15. Accordingly, the first encoder 11 outputs the control data including the image signal ID, the first type information, the type of the original image signal, and the reference image signal ID to the output unit 15.

The first generator 114 encodes the first original image signal received from the receiver 17 by the inter-frame prediction using the reference image signal received from the selector 112 to generate the base image encoded data. A publicly known method may be used in the inter-frame prediction encoding. The first generator 114 generates the base image encoded data from the first original image signal through this inter-frame prediction encoding. The first generator 114 also generates the base image decoded signal from the base image encoded data.

The base image decoded signal is obtained by decoding the base image encoded data. Specifically, the base image decoded signal is a decoded image signal of the base image encoded data obtained by decoding the reference image encoded data acquired through intra-frame prediction encoding carried out on the reference image signal and the aforementioned base image encoded data acquired through inter-frame encoding carried out on the first original image signal by using the aforementioned reference image signal.

Figure 4:
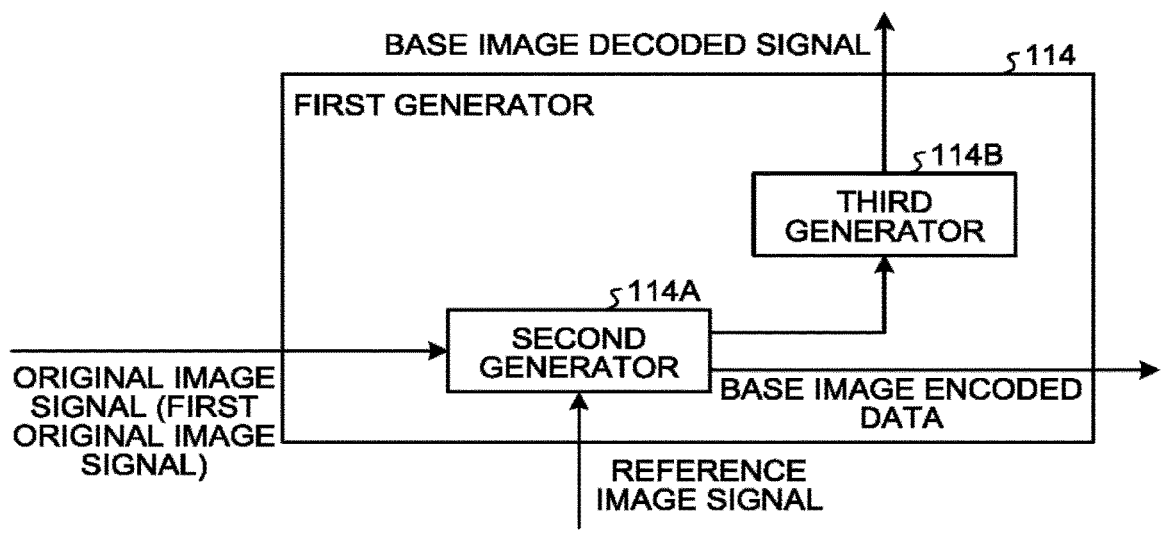
FIG. 4 is a schematic diagram illustrating a first generator.

FIG. 4 is a schematic diagram illustrating an exemplary configuration of the first generator 114. The first generator 114 includes a second generator 114A and a third generator 114B.

The second generator 114A receives the reference image signal from the selector 112 (see FIG. 3). The second generator 114A also receives the first original image signal from the receiver 17. Thereafter, the first generator 114 encodes the reference image signal by the intra-frame prediction, thereby generating the reference image encoded data. In other words, the reference image encoded data corresponds to an I-picture or an instantaneous decoding refresh (IDR) picture used in a publicly known encoding technique. Note that the I-picture and the IDR picture are pictures obtained through independent encoding solely within a frame.

Subsequently, the second generator 114A encodes the first original image signal by the inter-frame prediction using this reference image encoded data, thereby generating the base image encoded data. Accordingly, the base image encoded data is converted to data corresponding to a P-picture used in a publicly known encoding technique. Note that the P-picture is a picture obtained through encoding by way of the inter-frame prediction utilizing the I-picture or the P-picture as a prediction image. Specifically, the base image encoded data has a smaller amount of encoding than those of the I-picture and the IDR picture. For this reason, the encoding apparatus 10 can enhance an encoding efficiency.

Then, the second generator 114A outputs the base image encoded data to the output unit 15. The second generator 114A also outputs the reference image encoded data and the base image encoded data to the third generator 114B.

The third generator 114B receives the reference image encoded data and the base image encoded data from the second generator 114A. The third generator 114B decodes the reference image encoded data and the base image encoded data to generate a decoded image signal of the base image encoded data as the base image decoded signal. In other words, the third generator 114B decodes the reference image encoded data corresponding to the I-picture and the base image encoded data corresponding to the P-picture (data obtained by encoding the first original image signal as the P-picture), thereby generating the base image decoded signal serving as a decoded image signal obtained by decoding this P-picture.

Thereafter, the third generator 114B outputs the generated base image decoded signal to the second encoder 12 via the switch 13.

Here, in a case where the image signal to be processed is the first original image signal, the switching at the switch 13 and the switch 14 has been controlled such that the first encoder 11 is activated. Accordingly, the first generator 114

(the second generator 114A) outputs the generated base image encoded data to the output unit 15 via the switch 14. The control data is also output to the output unit 15 from the selector 112. As a consequence, in a case where the switching at the switch 13 and the switch 14 is controlled such that the first encoder 11 is activated, the output unit 15 is supposed to receive the control data including the image signal ID, the first type information, the type of the original image signal, and the reference image signal ID and the base image encoded data from the first encoder 11. In other words, in this case, the output unit 15 receives the base image encoded data and the control data including the reference image signal ID of the reference image signal used in the generation of this base image encoded data.

Meanwhile, when the switching is controlled such that the first encoder 11 is activated, the first encoder 11 and the second encoder 12 are in a state of being connected to each other. Accordingly, the third generator 114B outputs the generated base image decoded signal to the second encoder 12 via the switch 14.

Referring back to FIG. 1, the second encoder 12 will be described in detail.

The second encoder 12 encodes the second original image signal serving as the original image signal other than the first original image signal by the inter-frame prediction on the basis of the base image encoded data, thereby generating the standard encoded data.

The second encoder 12 may use a publicly known moving image encoding technique when encoding. For example, the second encoder 12 uses the publicly known moving image encoding techniques such as MPEG-2, H.264/AVC, and H.265/HEVC.

As described above, in a case where the image signal output from the receiver 17 is the second original image signal, the switch 13 has been put into a state, by the switching controller 16B, where the receiver 17 and the second encoder 12 are connected. In addition, the switch 14 has been put into a state where the second encoder 12 and the output unit 15 are connected.

Accordingly, the second original image signal output from the receiver 17 is output to the second encoder 12. The second encoder 12 encodes the second original image signal received from the receiver 17 by the inter-frame prediction on the basis of the base image encoded data just previously generated at the first encoder 11, thereby generating the standard encoded data.

The second encoder 12 according to the embodiment encodes the second original image signal by the inter-frame prediction using the base image decoded signal generated on the basis of the base image encoded data, thereby generating the standard encoded data.

In detail, while the switching is controlled such that the first encoder 11 is activated, the second encoder 12 holds the base image decoded signal received from that first encoder 11 until a new base image decoded signal is received from the first encoder 11.

Thereafter, at a timing when the switching is controlled such that the second encoder 12 is activated, the second encoder 12 encodes the second original image signal received from the receiver 17 by the intra-frame prediction using the held base image decoded signal to generate the standard encoded data. In other words, the second encoder 12 encodes the second original image signal by the intra-frame prediction using the base image decoded signal received from the first encoder 11 but does not output the standard encoded data that has been encoded to the output unit.

Accordingly, the standard encoded data output to the output unit corresponds to the P-picture or a B-picture used in a publicly known encoding technique, while the standard encoded data corresponding to the I-picture or the IDR picture is not output.

Here, in a case where the image signal to be processed is the second original image signal, the switching at the switch 13 and the switch 14 is controlled such that the second encoder 12 is activated. Accordingly, the second encoder 12 outputs the generated standard encoded data to the output unit 15 via the switch 14. The control data is also output to the output unit 15 from the controller 16.

As a consequence, in a case where the switching at the switch 13 and the switch 14 is controlled such that the second encoder 12 is activated, the output unit 15 receives the control data including the image signal ID, the second type information, and the type of the original image signal and the standard encoded data.

Thus, the base image decoded signal corresponding to the I-picture or the IDR picture with a large amount of encoding is not output to the output unit 15 but the base image encoded data and the standard encoded data corresponding to the P-picture or the B-picture with a small amount of encoding are output thereto.

Next, the output unit 15 will be described. The output unit 15 outputs the encoded data including the received base image encoded data and standard encoded data to the outside via the communication line 19. For example, the output unit outputs the encoded data to the decoding apparatus 20 via the communication line 19.

In detail, the output unit 15 outputs transmission information including the encoded data and the transmission control data. Note that the output unit 15 may output the encoded data and the transmission control data separately. The embodiment will describe a case where the output unit 15 outputs the transmission information including the encoded data and the transmission control data.

In addition, for example, a framework of supplemental enhancement information (SEI) in H.264/AVC or H.265/HEVC may be utilized for the communication of the transmission information.

The encoded data included in the transmission information includes the base image encoded data and the standard encoded data. The output unit 15 arranges the base image encoded data and the standard encoded data in the order of the reception from the first encoder 11 and the second encoder 12, respectively, to thereby constitute the encoded data.

The transmission control data included in the transmission information includes encoded control data corresponding to each item of the data that has been encoded to be included in the encoded data (the base image encoded data and the standard encoded data). The encoded control data corresponding to each item of the data that has been encoded is generated from the control data corresponding to each item of the data that has been encoded. The encoded control data corresponding to each item of the data that has been encoded includes a data ID and type information indicating a type of a picture. In addition, the encoded control data corresponding to the base image encoded data includes the reference image signal ID of the reference image signal used in the generation of this base image encoded data.

The generation of the transmission information will be specifically described.

In a case where the switching is controlled such that the first encoder 11 is activated, the output unit 15 receives the base image encoded data and the control data (the image signal ID, the first type information, the type of the original image signal, and the reference image signal ID) from the first encoder 11.

Meanwhile, in a case where the switching is controlled such that the second encoder 12 is activated, the output unit 15 receives the standard encoded data from the second encoder 12. In this case, the output unit 15 also receives the control data including the image signal ID, the second type information, and the type of the original image signal from the controller 16.

Thereafter, upon receiving the data that has been encoded to correspond to all of the image signals included in the original image signal acquired at the receiver 17 (the base image encoded data and the standard encoded data), the output unit 15 arranges the received data that has been encoded (the base image encoded data and the standard encoded data) in the order of the reception to thereby generate the encoded data.

The output unit 15 also generates the encoded control data corresponding to each item of the data that has been encoded (the base image encoded data and the standard encoded data) by using the control data received together with each item of that data.

In detail, the output unit 15 uses the image signal ID included in the control data as the data ID of the data that has been generated from the image signal identified by the image signal ID to be encoded (the base image encoded data and the standard encoded data). The output unit 15 also uses the type information included in the control data (the first type information and the second type information) as the type information indicating the type of the data that has been encoded and adds that type information to the encoded control data. Specifically, the first type information included in the encoded control data indicates that the type of the data that has been encoded is the base image encoded data. Meanwhile, the second type information included in the encoded control data indicates that the type of the data that has been encoded is the standard encoded data. Additionally, in a case where the reference image signal ID is included in the control data, the output unit 15 adds the reference image signal ID to the encoded control data.

Accordingly, the encoded control data corresponding to the base image encoded data includes the data ID, the first type information, and the reference image signal ID. Meanwhile, the encoded control data corresponding to the standard encoded data includes the data ID and the second type information.

Then, the output unit 15 arranges the encoded control data in the order of the reception of the corresponding control data to thereby generate the transmission control data.

Thereafter, the output unit 15 outputs the transmission information including the encoded data and the transmission control data.

Figure 5:
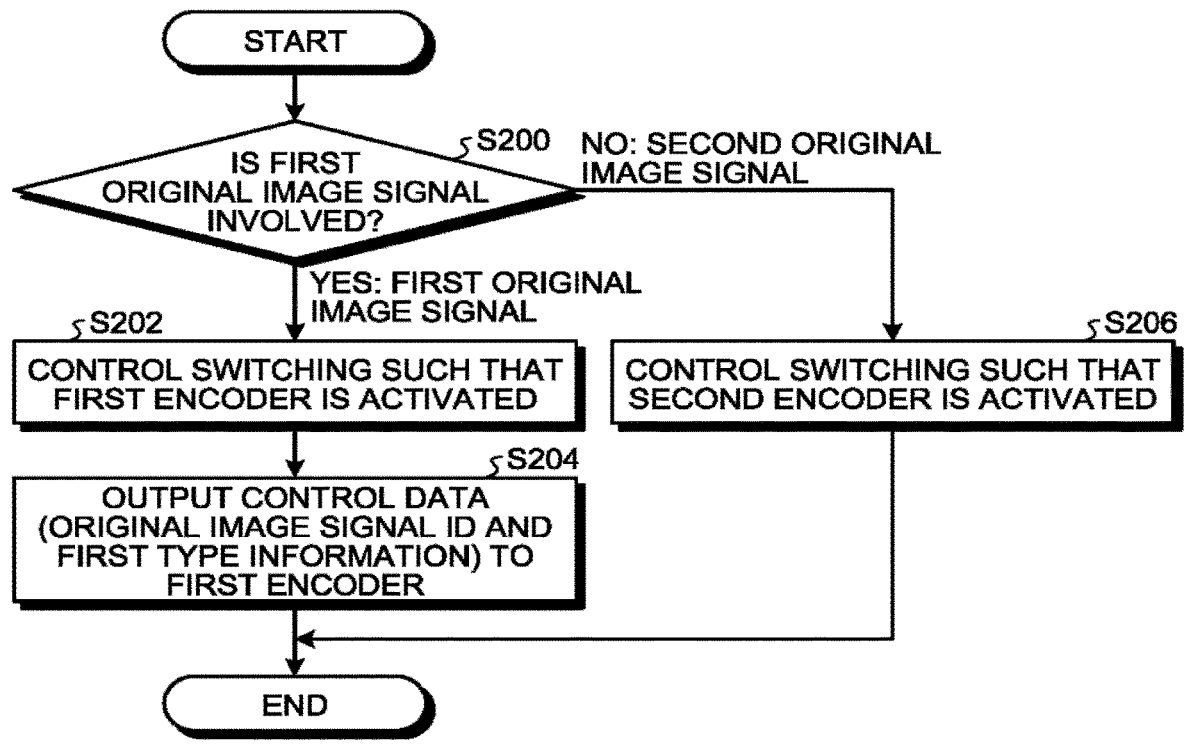
FIG. 5 is a flowchart illustrating procedures of processing carried out by an encoding apparatus.

Next, procedures of processing carried out by the controller 16 of the encoding apparatus 10 will be described. FIG. 5 is a flowchart illustrating the exemplary procedures of the processing carried out by the controller 16 of the encoding apparatus 10. The controller 16 implements the flowchart illustrated in FIG. 5 every time the image signal is received from the receiver 17.

First, the specifying unit 16A judges whether the image signal received from the receiver 17 is the first original image signal (step S200). When it is judged that the received image signal is the first original image signal (step S200: Yes), the processing proceeds to step S202.

At step S202, the switching controller 16B controls the switching at the switch 13 and the switch 14 such that the first encoder 11 is activated (step S202). Through the processing at step S202, the first encoder 11 and the second encoder 12 are put into a state of being connected to each other, while the first encoder 11 and the output unit 15 are put into a state of being connected to each other. In addition, the connection between the receiver 17 and the second encoder 12 is cancelled, while the connection between the receiver 17 and the first encoder 11 is activated.

Next, the switching controller 16B outputs, to the first encoder 11, the control data including the image signal ID of the image signal judged at step S200 and the first type information indicating that the first original image signal is involved (step S204). Then, this routine is terminated.

On the other hand, when it is distinguished at step S200 that the image signal received from the receiver 17 is the second original image signal (step S200: No), the processing proceeds to step S206. At step S206, the switching controller 16B controls the switching at the switch 13 and the switch 14 such that the second encoder 12 is activated (step S206). Through the processing at step S206, the receiver 17 and the second encoder 12 are put into a state of being connected to each other. In addition, the second encoder 12 and the output unit 15 are put into a state of being connected to each other. Then, this routine is terminated.

Next, procedures of processing carried out by the first encoder 11 and the second encoder 12 will be described. FIG. 6 is a flowchart illustrating the exemplary procedures of the processing carried out by the first encoder 11 and the second encoder 12.

First, the selector 112 receives the first original image signal from the receiver 17 (step S300). The selector 112 also receives the control data from the controller 16 (step S302).

Next, the degree-of-resemblance calculator 112A of the selector 112 reads, from the reference image management DB 110A, the reference image signal group corresponding to the type of the original image signal including the first original image signal received at step S300 (step S304). Through the processing at step S304, the degree-of-resemblance calculator 112A specifies the reference image signal group corresponding to the type of the original image signal.

Next, the degree-of-resemblance calculator 112A calculates the degree of resemblance between each of the reference image signals included in the reference image signal group read at step S304 and the first original image signal received at step S300 (step S306).

Then, the reference image selector 112B selects the reference image signal of which the degree of resemblance calculated at step S306 is equal to or higher than the threshold, from among the reference image signals read at step S304 (step S308).

Subsequently, the reference image selector 112B adds the reference image signal ID of the reference image signal selected at step S308 to the control data received at step S302 to output to the output unit 15 (step S310). Accordingly, the first encoder 11 outputs the control data including the image signal ID, the first type information, the type of the original image signal, and the reference image signal ID to the output unit 15.

Next, the second generator 114A of the first generator 114 encodes the reference image signal selected at step S308 by the intra-frame prediction, thereby generating the reference image encoded data (step S312).

Subsequently, the second generator 114A encodes the first original image signal received at step S300 by the inter-frame prediction using the reference image encoded data generated at step S312, thereby generating the base image encoded data (step S314).

Thereafter, the second generator 114A outputs the base image encoded data generated at step S314 to the output unit 15 (step S316).

Next, the third generator 114B decodes the base image encoded data generated at step S314 and the reference image encoded data generated at step S312 to generate the decoded image signal of that base image encoded data as the base image decoded signal (step S318).

Then, the third generator 114B outputs the base image decoded signal generated at step S318 to the second encoder 12 (step S320).

Upon receiving the second original image signal from the receiver 17, the second encoder 12 encodes the second original image signal by the intra-frame prediction using the base image decoded signal generated at step S318 to generate the standard encoded data (step S322) (the standard encoded data is not output to the output unit). Then, this routine is terminated. The reason why the base image decoded signal is encoded by the intra-frame prediction at the second encoder 12 is to generate a reference image for the subsequent encoding timing when the second original image signal is encoded by the inter-frame prediction. Through this processing, it is made possible to generate, at an inverse transformer 22, the same resultant data as that obtained by encoding the base image decoded signal by the intra-frame prediction.

As described thus far, the encoding apparatus 10 according to the embodiment includes the specifying unit 16A, the first encoder 11, and the second encoder 12. The specifying unit 16A specifies the first original image signal included in the original image signal. The first encoder 11 generates the base image encoded data obtained by encoding the first original image signal by the inter-frame prediction using the reference image signal. The second encoder 12 generates the standard encoded data obtained by encoding the second original image signal serving as the original image signal other than the first original image signal by the inter-frame prediction based on the base image encoded data.

As mentioned above, the encoding apparatus 10 according to the embodiment encodes the plurality of image signals (frames) included in the original image signal by the inter-frame prediction, thereby generating the base image encoded data and the standard encoded data. In addition, as for the first original image signal, the encoding apparatus 10 uses the reference image signal instead of the image signal included in the original image signal to carry out the inter-frame prediction encoding, thereby generating the base image encoded data. In addition, as for the second original image signal, the encoding apparatus 10 carries out the inter-frame prediction encoding based on the base image encoded data instead of the image signal included in the original image signal, thereby generating the standard encoded data. In detail, as described above, the encoding apparatus 10 encodes the second original image signal by using the base image decoded signal generated on the basis of the base image encoded data to generate the standard encoded data. Additionally, the base image decoded signal is not output to the output unit 15.

Consequently, by generating the encoded data including the base image encoded data and the standard encoded data, the encoding apparatus 10 can provide the encoded data that enables image transmission with high quality and low delay even through a transmission path in a narrow band and also is capable of accepting the random access.

In detail, the first encoder 11 encodes the first original image signal by the inter-frame prediction using the reference image signal, thereby generating the base image encoded data. Therefore, the reduction of data amount can be achieved more than a case where the first original image signal is encoded by the intra-frame prediction. In addition, the base image encoded data is generated by encoding the first original image signal by the inter-frame prediction using the reference image signal and thus, compared to a case where the first original image signal is encoded by the inter-frame prediction using another first original image signal or other standard encoded data, the deterioration in image quality is suppressed, while the base image encoded data with high quality and a small amount of encoding can be generated. In addition, the encoded data is configured by including such high quality base image encoded data and thus, the encoded data can be configured to be able to accept the random access.

Furthermore, as for the second original image signal, the second encoder 12 of the encoding apparatus 10 carries out the inter-frame prediction encoding based on the base image decoded signal generated on the basis of the base image encoded data to thereby generate the standard encoded data. As mentioned above, the second encoder 12 encodes the second original image signal by the inter-frame prediction using the base image decoded signal generated on the basis of the base image encoded data generated earlier, thereby generating the standard encoded data. Consequently, the second encoder 12 can generate the standard encoded data with a small amount of encoding, while suppressing the deterioration in image quality.

Additionally, the base image decoded signal used in the generation of the standard encoded data has a large amount of encoding equivalent to that of the I-picture but is not output to the output unit 15. Consequently, the encoding apparatus 10 according to the embodiment can achieve the reduction of data amount of the encoded data.

Figure 7A:
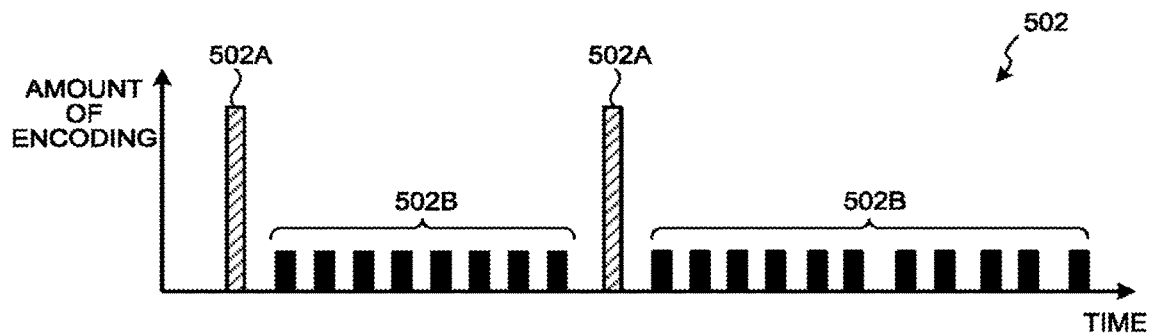
FIGS. 7A and 7B are explanatory diagrams for an effect of the encoding apparatus.
Figure 7B:
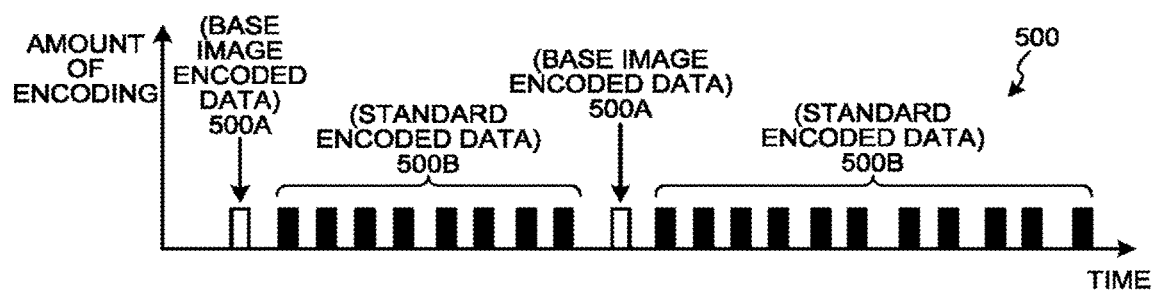

FIGS. 7A and 7B are explanatory diagrams for an effect of the encoding apparatus 10 according to the embodiment. FIG. 7A is a schematic diagram illustrating exemplary comparative encoded data 502 generated through a conventional technique. FIG. 7B is a schematic diagram illustrating exemplary encoded data 500 generated by the encoding apparatus 10 according to the embodiment.

As illustrated in FIG. 7A, the comparative encoded data 502 includes an I-picture 502A and a P- or B-picture 502B. The I-picture 502A is inserted for a transition of a scene or the random access. The I-picture 502A is of higher image quality than that of the P- or B-picture 502B but has a larger amount of encoding. Accordingly, although the high image quality can be achieved, the data amount of the comparative encoded data 502 has increased.

In contrast to this, as illustrated in FIG. 7B, the encoded data 500 generated by the encoding apparatus 10 according to the embodiment includes the base image encoded data 500A instead of the I-picture 502A and the standard encoded data 500B instead of the P- or B-picture 502B.

As described above, the base image encoded data 500A is a picture generated through the encoding of the first original image signal by the inter-frame prediction using the reference image signal. Accordingly, the base image encoded data 500A has a smaller amount of encoding than that of the I-picture 502A generated through the intra-frame prediction encoding. In addition, the reference image signal stored in advance is used in the creation of the base image encoded data 500A. Consequently, the encoding apparatus 10 can generate the base image encoded data 500A with a reduced amount of encoding, while suppressing the deterioration in image quality.

Meanwhile, the standard encoded data 500B is generated by encoding the second original image signal by the inter-frame prediction based on the base image encoded data 500A. Accordingly, the standard encoded data 500B has a small amount of encoding which is comparable to that of the P- or B-picture 502B. In addition, the standard encoded data 500B is generated through the inter-frame prediction encoding based on the base image encoded data 500A. Consequently, the encoding apparatus 10 can generate the standard encoded data 500B with a reduced amount of encoding, while suppressing the deterioration in image quality.

Therefore, by generating the encoded data including the base image encoded data 500A and the standard encoded data 500B described above, the encoding apparatus 10 according to the embodiment can provide the encoded data that enables image transmission with high quality and low delay even through a transmission path in a narrow band and also is capable of accepting the random access.

Additionally, the first encoder 11 and the second encoder 12 do not output, to the output unit 15, the base image decoded signal and the reference image encoded data generated through the intra-frame prediction encoding used in the generation of the base image encoded data and the standard encoded data, respectively. Accordingly, the encoded data does not include a picture with a large amount of encoding corresponding to the I-picture.

Therefore, the encoding apparatus 10 according to the embodiment can provide the encoded data that enables image transmission with high quality and low delay and also is capable of accepting the random access.

In addition, the function of the second encoder 12 of the encoding apparatus 10 according to the embodiment is similar to that of a publicly known encoding function unit except that the base image decoded signal received from the first encoder 11 is used during the intra-frame prediction encoding. Accordingly, the encoding apparatus 10 can be configured by additionally giving the function of the first encoder 11 to the publicly known encoding apparatus.

For this reason, in addition to the aforementioned effect, the encoding apparatus 10 according to the embodiment has versatility for use in a variety of conditions.

Decoding Apparatus

The description will be continued by referring back to FIG. 1. Next, the decoding apparatus 20 will be described.

The decoding apparatus 20 includes a receiver 21, the inverse transformer 22, a standard decoder 23, a switch 24, a switch 25, and a controller 26.

Note that, although FIG. 1 mainly exemplifies functions relating to the embodiment, the functions included in the decoding apparatus 20 are not limited thereto. These respective processing functions will be described later.

Part or all of the receiver 21, the inverse transformer 22, the standard decoder 23, the switch 24, the switch 25, and the controller 26 may be implemented by, for example, causing a processing apparatus such as the CPU to execute a program, namely, by software, or may be implemented by hardware such as the IC, or alternatively, may be implemented by a combination of software and hardware.

For example, each of the functions of the decoding apparatus 20 is stored in a storage circuit in a form of a program executable by a computer. The decoding apparatus 20 is a processor that implements a function corresponding to each of the programs by reading the program from the storage circuit to execute. Thus, after reading the individual program, the decoding apparatus 20 is supposed to have each of the functions within the decoding apparatus 20 illustrated in FIG. 1. In addition, FIG. 1 has illustrated a case where the receiver 21, the inverse transformer 22, the standard decoder 23, the switch 24, the switch 25, and the controller 26 are implemented by a single processing circuit. However, the decoding apparatus 20 may be constituted by combining a plurality of independent processors such that the functions are implemented by the respective processors through the execution of the programs. There may be a case where each of the processing functions is configured as a program such that a single processing circuit executes each of the programs, or alternatively, there may be a case where a specific function is implemented in a dedicated independent program execution circuit.

The decoding apparatus 20 is an apparatus that decodes the encoded data. The receiver 21 receives the transmission information. The receiver 21 receives the transmission information from the encoding apparatus 10 via the communication line 19. In addition, the receiver 21 may read the transmission information from the storage circuit.

The receiver 21 outputs the transmission control data included in the transmission information to the controller 26. The receiver 21 according to the embodiment outputs the plurality of items of the encoded control data included in the transmission control data to the controller 26 in the order from a top item of the encoded control data.

The receiver 21 also outputs the encoded data included in the transmission information to the switch 24. The receiver 21 outputs each item of the data that has been encoded to be included in the encoded data (the base image encoded data and the standard encoded data) to the switch 24 in the order from a top picture.

In addition, the receiver 21 outputs the data that has been encoded to be identified by the data ID included in the encoded control data to the switch 24 after this encoded control data is output to the controller 26. In detail, the receiver 21 outputs the encoded control data to the controller 26 and, after the switching control of the switch 24 described later is carried out by the controller 26, outputs the data that has been encoded to be identified by the data ID included in that encoded control data to the inverse transformer 22 via the switch 24.

Accordingly, the inverse transformer 22 is assumed to receive the data that has been encoded (specifically, the base image encoded data) and the encoded control data corresponding to that data at substantially similar timings.

The switch 24 switches a connection state of the receiver 21 on an output side to a state where the receiver 21 and the inverse transformer 22 are connected or a state where the receiver 21 and the switch 25 are connected.

The switch 24 includes a first connection terminal 24A, a second connection terminal 24B, and a connection terminal 24C. The connection terminal 24C is connected to the receiver 21. The first connection terminal 24A is connected to the inverse transformer 22. The second connection terminal 24B is connected to the switch 25.

The switch 24 is switched to any one of a state where the connection terminal 24C and the first connection terminal 24A are connected and a state where the connection terminal 24C and the second connection terminal 24B are connected. The controller 26 controls the switching of the connection state at the switch 24 (details will be described later).

The switch 25 switches the connection state of the standard decoder 23 on an input side.

The switch 25 includes a first connection terminal 25A, a second connection terminal 25B, and a connection terminal 25C. The first connection terminal 25A is connected to the inverse transformer 22. The second connection terminal 25B is connected to the second connection terminal 24B of the switch 24. The connection terminal 25C is connected to the standard decoder 23.

The switch 25 is switched to any one of a state where the first connection terminal 25A and the connection terminal 25C are connected and a state where the second connection terminal 25B and the connection terminal 25C are connected. The controller 26 controls the switching of the connection state at the switch 25 (details will be described later).

The controller 26 controls the switch 24, the inverse transformer 22, and the switch 25 on the basis of the encoded control data received from the receiver 21.

The controller 26 according to the embodiment includes a distinguishing unit 26A and a switching controller 26B. The distinguishing unit 26A distinguishes whether the data that has been encoded to be identified by the data ID included in the encoded control data received from the receiver 21 is the base image encoded data or the standard encoded data. The distinguishing unit 26A distinguishes whether the type information received from the receiver 21 while being included in the encoded control data is the first type information or the second type information to thereby distinguish whether the base image encoded data is involved or the standard encoded data is involved. Specifically, the distinguishing unit 26A distinguishes that the base image encoded data is involved in the case of the first type information. Meanwhile, the distinguishing unit 26A distinguishes that the standard encoded data is involved in the case of the second type information.

The switching controller 26B controls the switching at the switch 24 and the switch 25 on the basis of a distinguishing result by the distinguishing unit 26A.

In a case where the distinguishing unit 26A distinguishes that a picture to be processed is the base image encoded data, the switching controller 26B controls the switching at the switch 24 and the switch 25 such that the inverse transformer 22 is activated. Controlling the switching to activate the inverse transformer 22 means controlling the switch 24 such that the receiver 21 and the inverse transformer 22 are connected, while controlling the switch 25 such that the inverse transformer 22 and the standard decoder 23 are connected. In detail, in this case, the switching controller 26B controls the switch 24 such that the connection terminal 24C and the first connection terminal 24A are connected. The switching controller 26B also controls the switch 25 such that the first connection terminal 25A and the connection terminal 25C are connected.

Accordingly, when the switching controller 26B controls the switching at the switch 24 and the switch 25 to activate the inverse transformer 22, each pair of the receiver 21 and the inverse transformer 22 and the inverse transformer 22 and the standard decoder 23 is put into a state of being connected to each other.

As a consequence, the base image encoded data output from the receiver 21 is output to the inverse transformer 22 via the switch 24 in this case. Thereafter, the inverse transformer 22 carries out processing described later on the received base image encoded data. In addition, in this case, the standard decoder 23 is put into a state of being able to receive a signal from the inverse transformer 22.

Additionally, in a case where the distinguishing unit 26A distinguishes that a picture to be processed is the base image encoded data, the switching controller 26B outputs the reference image signal ID included in the encoded control data to the inverse transformer 22. Specifically, the switching controller 26B outputs, to the inverse transformer 22, the reference image signal ID of the reference image signal used during the encoding of the base image encoded data output to the inverse transformer 22 from the receiver 21.

On the other hand, in a case where the distinguishing unit 26A distinguishes that the data that has been encoded to serve as an object to be processed is the standard encoded data, the switching controller 26B controls the switching at the switch 24 and the switch 25 such that the inverse transformer 22 is inactivated. Controlling the switching to inactivate the inverse transformer 22 means controlling the switch 24 and the switch 25 such that the receiver 21 and the standard decoder 23 are connected. In detail, in this case, the switching controller 26B controls the switch 24 such that the connection terminal 24C and the second connection terminal 24B are connected. The switching controller 26B also controls the switch 25 such that the second connection terminal 25B and the connection terminal 25C are connected.

Accordingly, when the switching controller 26B controls the switching at the switch 24 and the switch 25 to inactivate the inverse transformer 22, the receiver 21 and the standard decoder 23 are put into a state of being directly connected to each other without intervening of the inverse transformer 22.

As a consequence, the standard encoded data output from the receiver 21 is output to the standard decoder 23 via the switch 24 and the switch 25 in this case.

Next, the inverse transformer 22 will be described. The inverse transformer 22 generates the standard encoded data from the base image encoded data by using this base image encoded data and the reference image signal used in the encoding of this base image encoded data. The inverse transformer 22 decodes the base image encoded data included in the encoded data by using the reference image signal used in the encoding of this base image encoded data to generate the base image decoded signal. Thereafter, the inverse transformer 22 encodes the above-mentioned base image decoded signal by the intra-frame prediction to generate the standard encoded data.

Figure 8:
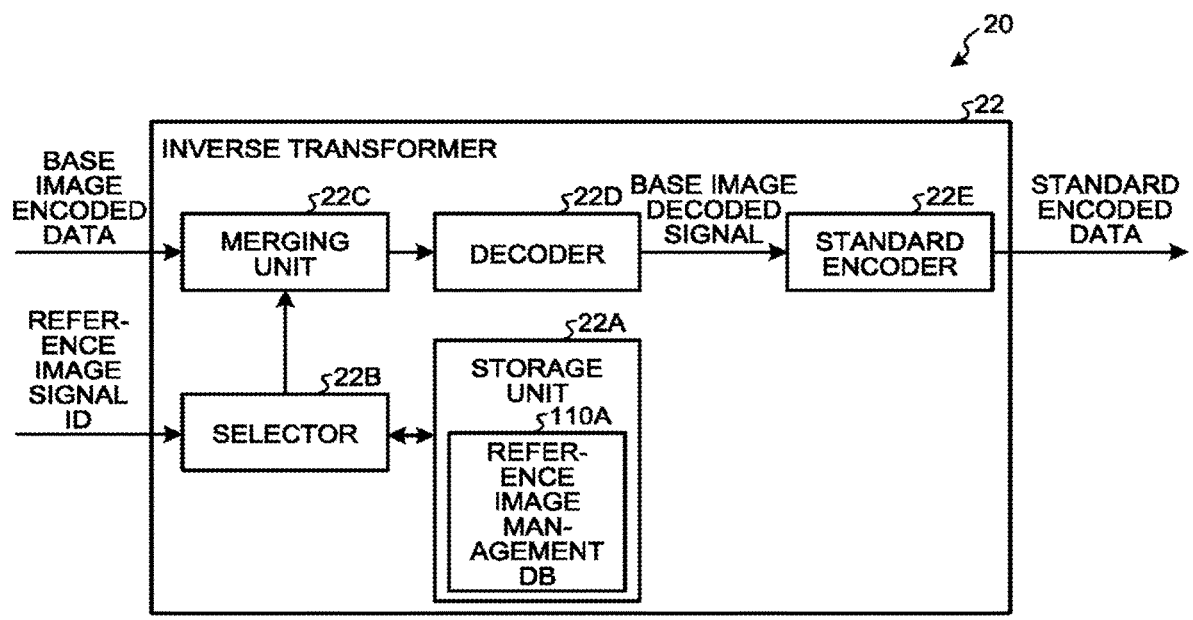
FIG. 8 is a schematic diagram illustrating a configuration of an inverse transformer.

FIG. 8 is a schematic diagram illustrating an exemplary configuration of the inverse transformer 22. The inverse transformer 22 includes a storage unit 22A, a selector 22B, a merging unit 22C, a decoder 22D, and a standard encoder 22E.

The storage unit 22A stores the reference image management DB 110A in advance. Note that the description assumes that the reference image signal encoded by the intra-frame prediction (i.e., the reference image encoded data) is stored in the reference image management DB 110A in the decoding apparatus 20.

The selector 22B receives the reference image signal ID from the switching controller 26B. This reference image signal ID is the reference image signal ID of the reference image signal used during the encoding of the base image encoded data received by the inverse transformer 22 from the receiver 21.

The selector 22B reads the reference image signal corresponding to the received reference image signal ID from the reference image management DB 110A in the storage unit 22A. Thereafter, the selector 22B outputs the read reference image signal to the merging unit 22C.

The merging unit 22C merges the base image encoded data received from the receiver 21 with the reference image signal received from the selector 22B to output to the decoder 22D. As described above, the base image encoded data corresponds to the P-picture. Meanwhile, as described above, the reference image signal stored in the storage unit 22A corresponds to the I-picture because of being subjected to the intra-frame prediction encoding. Accordingly, the merging unit 22C outputs the reference image signal (reference image encoded data) serving as the I-picture and the base image encoded data serving as the P-picture to the decoder 22D.

The decoder 22D receives the base image encoded data and the reference image signal used in the encoding of this base image encoded data from the merging unit 22C. The decoder 22D decodes the received base image encoded data and the received reference image encoded data to generate the base image decoded signal obtained by decoding this base image encoded data. A publicly known method can be used for this decoding method.

Thereafter, the decoder 22D outputs the generated base image decoded signal to the standard encoder 22E. The standard encoder 22E encodes the base image decoded signal by the intra-frame prediction, thereby generating the standard encoded data. The standard encoded data corresponds to the I-picture generated through a publicly known encoding technique.

As a consequence, the inverse transformer 22 transforms the base image encoded data included in the transmission information to data corresponding to the I-picture generated through a usual encoding technique to generate the standard encoded data. Thereafter, the standard encoder 22E of the inverse transformer 22 outputs the generated standard encoded data to the standard decoder 23.

Referring back to FIG. 1, the standard decoder 23 will be described. The standard decoder 23 decodes each of the standard encoded data received from the inverse transformer 22 and the standard encoded data received from the receiver 21. The standard decoder 23 uses a standard decoding technique corresponding to a standard encoding technique used at the second encoder 12 when decoding the standard encoded data.

Then, the standard decoder 23 outputs a decoded image signal obtained by decoding the standard encoded data.

Figure 9:
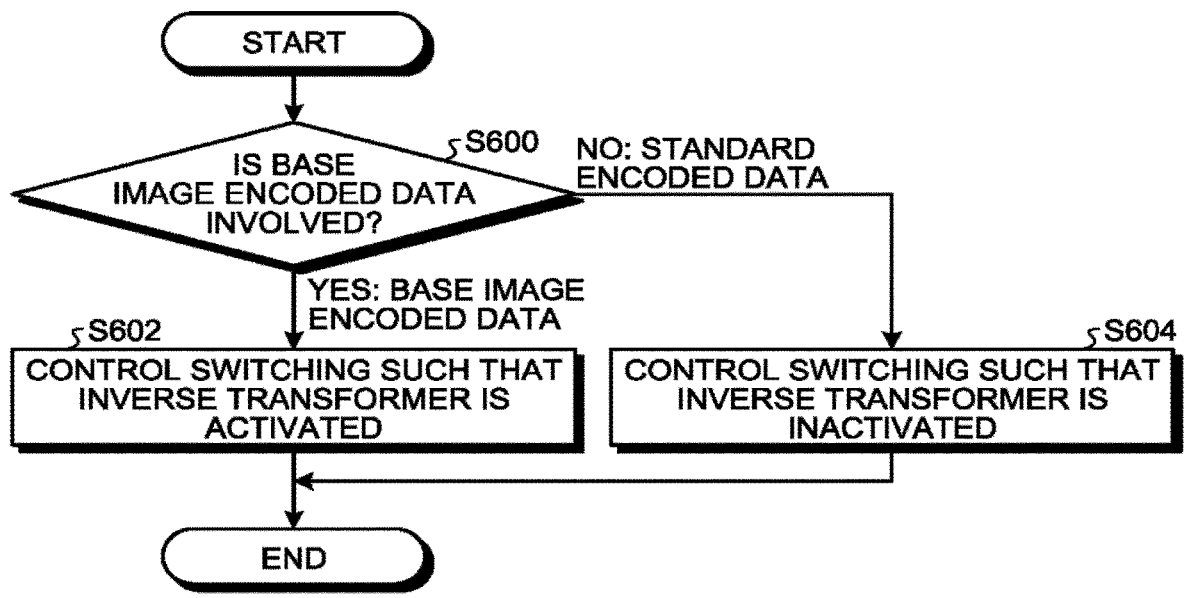
FIG. 9 is a flowchart illustrating procedures of processing carried out by a decoding apparatus.

Next, procedures of processing carried out by the controller 26 of the decoding apparatus 20 will be described. FIG. 9 is a flowchart illustrating the exemplary procedures of the processing carried out by the controller 26 of the decoding apparatus 20. The controller 26 carries out a processing routine illustrated in FIG. 9 every time the encoded control data is received from the receiver 21.

First, the distinguishing unit 26A distinguishes whether the data that has been encoded to serve as an object to be processed is the base image encoded data or the standard encoded data (step S600). When the data that has been encoded to serve as an object to be processed is the base image encoded data (step S600: Yes), the processing proceeds to step S602.

At step S602, the switching controller 26B controls the switching at the switch 24 and the switch 25 such that the inverse transformer 22 is activated (step S602). Through the processing at step S602, the receiver 21 and the standard decoder 23 are put into a state of being connected to each other via the inverse transformer 22. Then, this routine is terminated.

On the other hand, when it is distinguished at step S600 that the data that has been encoded to serve as an object to be processed is the standard encoded data (step S600: No), the processing proceeds to step S604. At step S604, the switching controller 26B controls the switching at the switch 24 and the switch 25 such that the inverse transformer 22 is inactivated (step S604). Through the processing at step S604, the receiver 21 and the standard decoder 23 are put into a state of being directly connected to each other without intervening of the inverse transformer 22. Then, this routine is terminated.

Figure 10:
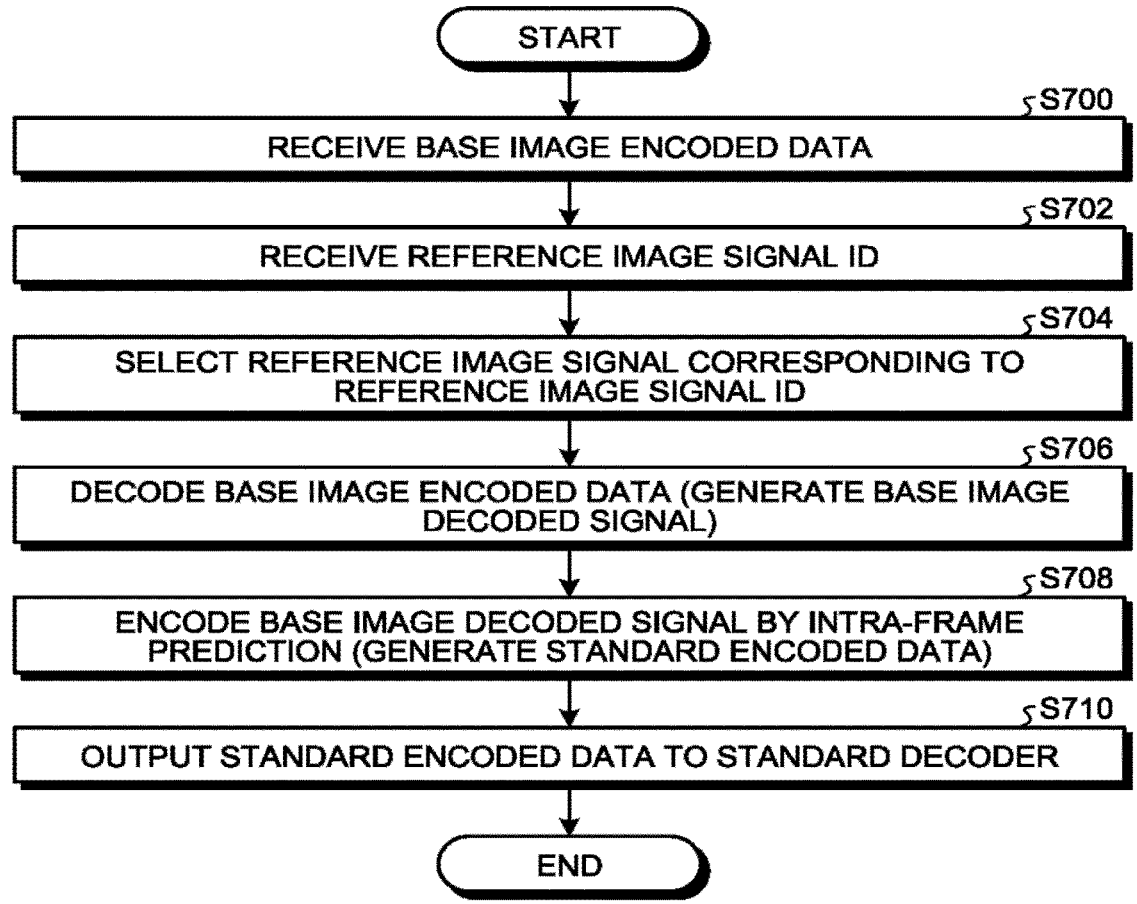
FIG. 10 is a flowchart illustrating procedures of processing carried out by the inverse transformer.

Next, procedures of processing carried out by the inverse transformer 22 will be described. FIG. 10 is a flowchart illustrating the exemplary procedures of the processing carried out by the inverse transformer 22.

First, the merging unit 22C receives the base image encoded data from the receiver 21 (step S700). Next, the selector 22B receives the reference image signal ID from the switching controller 26B (step S702). This reference image signal ID is the reference image signal ID of the reference image signal used during the encoding of the base image encoded data at step S700.

Next, the selector 22B reads the reference image signal corresponding to the reference image signal ID received at step S702 from the reference image management DB 110A in the storage unit 22A. As a consequence, the selector 22B selects the reference image signal (step S704). The selector 22B outputs the read reference image signal to the merging unit 22C.

Next, the decoder 22D decodes the base image encoded data received from the merging unit 22C and the reference image signal (the reference image encoded data) received from the merging unit 22C to generate the base image decoded signal obtained by decoding that base image encoded data (step S706). The decoder 22D outputs the base image decoded signal generated at step S706 to the standard encoder 22E.

The standard encoder 22E encodes the base image decoded signal generated at step S706 by the intra-frame prediction, thereby generating the standard encoded data (step S708). Thereafter, the standard encoder 22E outputs the generated standard encoded data to the standard decoder 23 (step S710). Accordingly, the standard encoded data is output to the standard decoder 23 from the inverse transformer 22 and the receiver 21. Then, the standard decoder 23 decodes the standard encoded data to output the decoded image signal. Then, this routine is terminated.

As described thus far, the decoding apparatus 20 according to the embodiment includes the receiver 21, the inverse transformer 22, and the standard decoder 23. The receiver 21 receives the transmission information including the encoded data including the base image encoded data and the standard encoded data. The inverse transformer 22 decodes the base image encoded data included in the encoded data by using the reference image signal used in the encoding of the base image encoded data to generate the base image decoded signal. Thereafter, the inverse transformer 22 encodes the above-mentioned base image decoded signal by the intra-frame prediction to generate the standard encoded data. The standard decoder 23 decodes the standard encoded data.

As mentioned above, the decoding apparatus 20 according to the embodiment decodes the encoded data generated at the encoding apparatus 10.

Accordingly, the decoding apparatus 20 according to the embodiment can achieve an effect similar to that of the encoding apparatus 10.

In addition, as descried above, the encoded data received from the encoding apparatus 10 does not include the base image decoded signal corresponding to the I-picture or the IDR picture. However, the standard encoded data included in the encoded data is a picture generated by using the base image decoded signal and the reference image signal. Therefore, as for the standard encoded data included in the encoded data, the re-encoding does not need to be carried out at the decoding apparatus 20.

Meanwhile, the standard decoder 23 of the decoding apparatus 20 can receive the standard encoded data as the encoded data including the I-picture or the IDR picture, which is obtained through usual encoding.

Consequently, it is possible for the image processing system 1 including the encoding apparatus 10 and the decoding apparatus 20 according to the embodiment to achieve an effect similar to that of the aforementioned encoding apparatus 10 and at the same time, to obtain the encoded data that enables the encoding at high quality in a narrow band and also is capable of accepting the random access with a low delay.

Second Embodiment

FIG. 1 is a schematic diagram illustrating an exemplary image processing system 1A according to the present embodiment. The image processing system 1A includes an encoding apparatus 10A and a decoding apparatus 20. The image processing system 1A is similar to the image processing system 1 according to the first embodiment except that the encoding apparatus 10A is included therein instead of the encoding apparatus 10.

The encoding apparatus 10A is similar to the encoding apparatus 10 according to the first embodiment except that a first encoder 11A is included therein instead of the first encoder 11.

As in the first encoder 11, the first encoder 11A encodes the first original image signal by the inter-frame prediction using the reference image signal, thereby generating the base image encoded data. The first encoder 11A also generates a local decoded signal generated on the basis of the first original image signal and the reference image signal as the base image decoded signal.

FIG. 3 is a schematic diagram illustrating an exemplary configuration of the first encoder 11A. The first encoder 11A is similar to the first encoder 11 except that a first generator 116 is included therein instead of the first generator 114. Note that the first encoder 11A according to the embodiment uses the reference image signal encoded by the intra-frame prediction (i.e., the reference image encoded data) as the reference image signal. Accordingly, it is assumed that the reference image signal encoded by the intra-frame prediction (the reference image encoded data) is registered in a reference image management DB 110A in the first encoder 11A.

Figure 11:
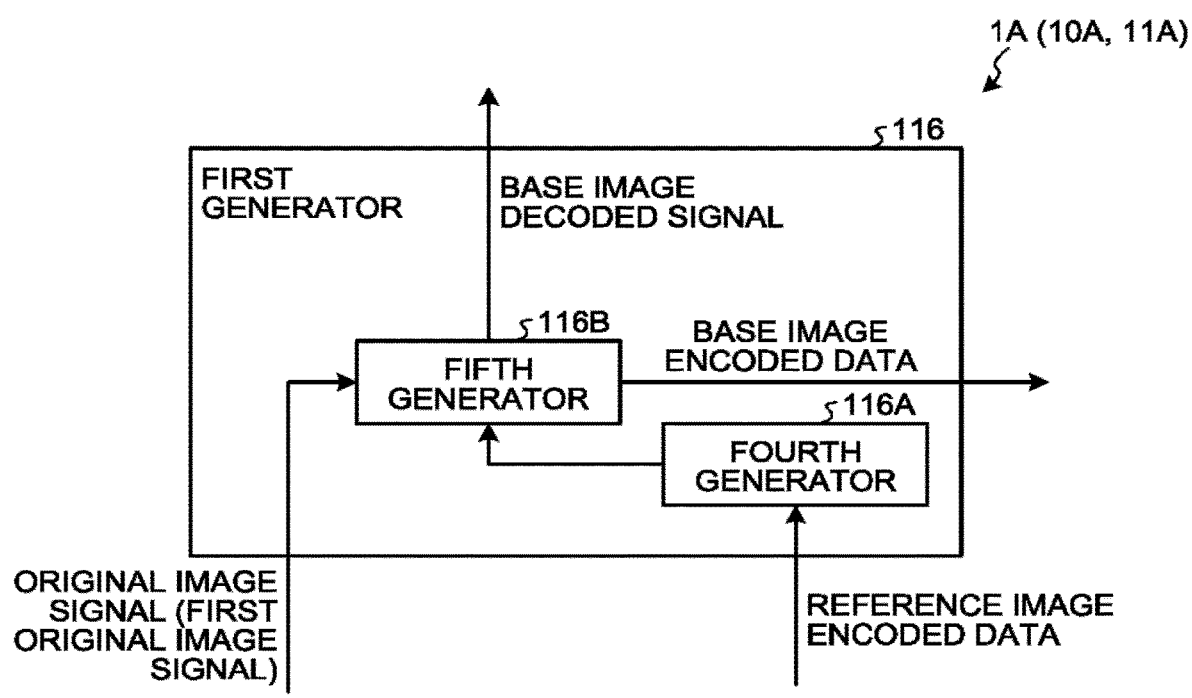
FIG. 11 is a schematic diagram illustrating a configuration of a first generator.

FIG. 11 is a schematic diagram illustrating an exemplary configuration of the first generator 116.

The first generator 116 includes a fourth generator 116A and a fifth generator 116B.

The fourth generator 116A receives the reference image signal from a selector 112 (see FIG. 3). The fourth generator 116A according to the embodiment receives the reference image encoded data (the reference image signal encoded by the intra-frame prediction) from the selector 112. The fourth generator 116A decodes the reference image encoded data to generate the reference image signal. Thereafter, the fourth generator 116A outputs the reference image signal to the fifth generator 116B.

The fifth generator 116B receives the first original image signal from a receiver 17. The fifth generator 116B also receives the reference image signal from the fourth generator 116A. Thereafter, the fifth generator 116B encodes the first original image signal by the inter-frame prediction using the reference image signal to generate the base image encoded data. Then, the fifth generator 116B outputs the generated base image encoded data to an output unit 15.

The fifth generator 116B also generates the local decoded signal generated on the basis of the first original image signal and the reference image signal as the base image decoded signal. Thereafter, the fifth generator 116B outputs the generated base image decoded signal to a second encoder 12.

Figure 12:
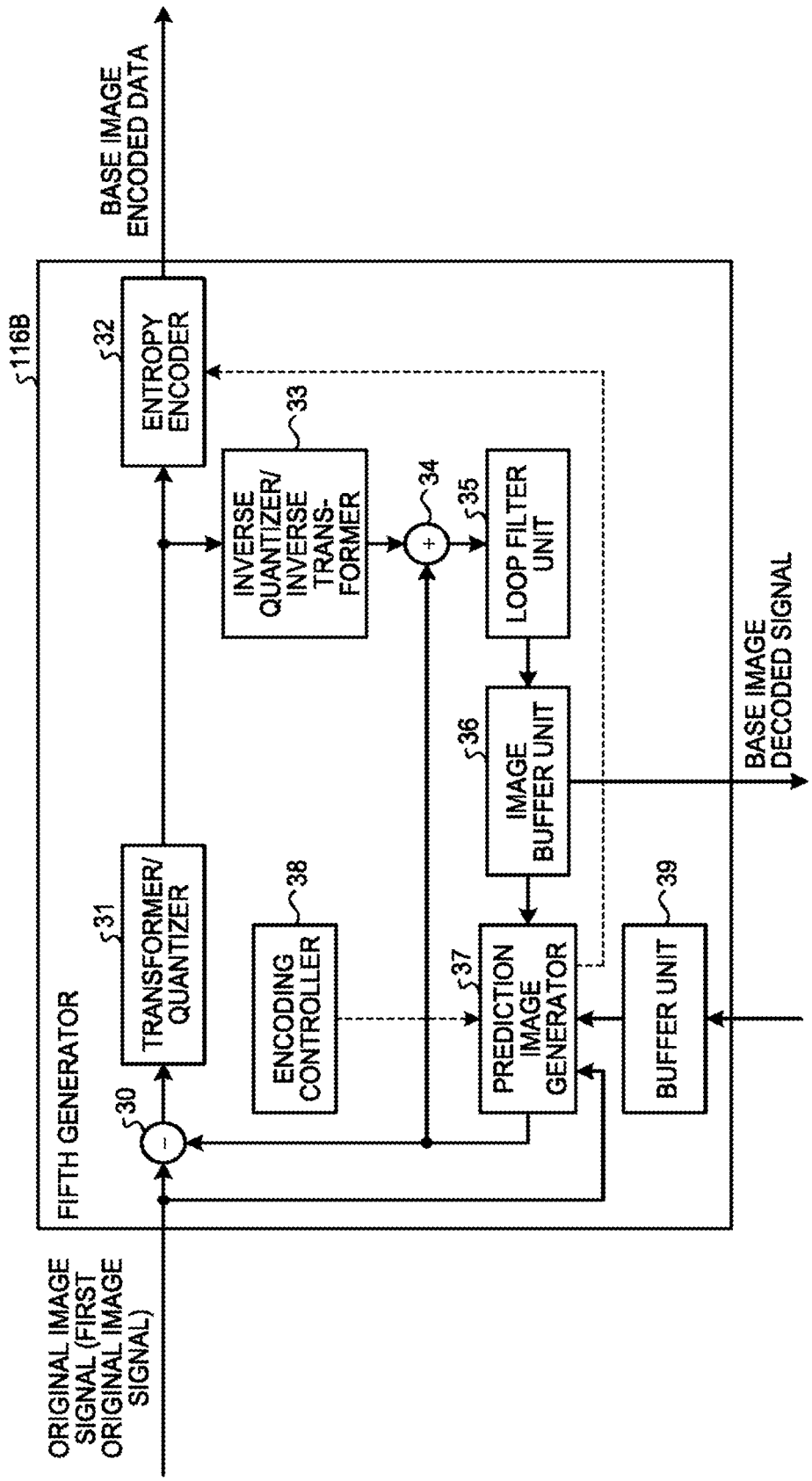
FIG. 12 is a schematic diagram illustrating a configuration of a fifth generator.

Next, the fifth generator 116B will be described in detail. FIG. 12 is a schematic diagram illustrating an exemplary configuration of the fifth generator 116B.

The fifth generator 116B includes a subtractor 30, a transformer/quantizer 31, an entropy encoder 32, an inverse quantizer/inverse transformer 33, an adder 34, a loop filter unit 35, an image buffer unit 36, a prediction image generator 37, an encoding controller 38, and a buffer unit 39.

The buffer unit 39 stores the reference image signal received from the fourth generator 116A.

The subtractor 30 receives the first original image signal. Thereafter, the subtracter 30 obtains a difference between the first original image signal and a prediction image signal generated at the prediction image generator 37 to generate a prediction error signal representing this difference. The transformer/quantizer 31 generates a transform coefficient by transforming the prediction error signal and then generates a quantization coefficient by quantizing the transform coefficient.

Examples of transform methods for the prediction error signal include orthogonal transform using the discrete cosine transform (DCT), the wavelet transform, and the independent component analysis. The transformer/quantizer 31 uses any one of these transform methods to transform the prediction error signal. The transformer/quantizer 31 also quantizes the transform coefficient by using a quantization parameter set in advance.

The inverse quantizer/inverse transformer 33 carries out inverse quantization on the quantization coefficient to subsequently carry out inverse transform thereon, thereby reconstructing the prediction error signal. That is, the inverse quantizer/inverse transformer 33 carries out inverse processing of the processing by the transformer/quantizer 31 on the quantization coefficient. Specifically, in a case where the transformer/quantizer 31 carries out the DCT and the quantization, the inverse quantizer/inverse transformer 33 carries out the inverse quantization and inverse discrete cosine transform (IDCT).

The adder 34 receives the prediction error signal from the inverse quantizer/inverse transformer 33 and receives the prediction image from the prediction image generator 37. Thereafter, the adder 34 adds the prediction error signal to the prediction image and then generates the local decoded signal to send to the loop filter unit 35.

The loop filter unit 35 carries out loop filter processing such as deblocking filtering on the local decoded signal and then sends a result thereof to the image buffer unit 36.

The image buffer unit 36 stores the local decoded signals for one or more number of the image signals as the reference image signals for generating the prediction image. The image buffer unit 36 outputs this reference image signal to the prediction image generator 37. The image buffer unit 36 also outputs the local decoded signal to the second encoder 12 as the base image decoded signal.

The reference image signal received from the fourth generator 116A is stored in the buffer unit 39. The buffer unit 39 outputs the reference image signal received from the fourth generator 116A to the prediction image generator 37.

The prediction image generator 37 generates the prediction image by using the first original image signal, the reference image signal received from the image buffer unit 36, the reference image signal received from the buffer unit 39, and prediction control information received from the encoding controller 38. Thereafter, the prediction image generator 37 sends the generated prediction image to the subtractor 30 and the adder 34. The prediction image generator 37 also sends prediction information to the entropy encoder 32.

The encoding controller 38 generates the prediction control information to output to the prediction image generator 37. The entropy encoder 32 receives the prediction information from the prediction image generator 37. The entropy encoder 32 also receives the quantization coefficient from the transformer/quantizer 31. The entropy encoder 32 carries out the entropy encoding on the quantization coefficient and the prediction information in accordance with syntax determined in advance to generate the base image encoded data.

The entropy encoder 32 uses, for example, Huffman coding or arithmetic coding when carrying out the entropy encoding. The entropy encoder 32 outputs the generated base image encoded data.

Figure 13:
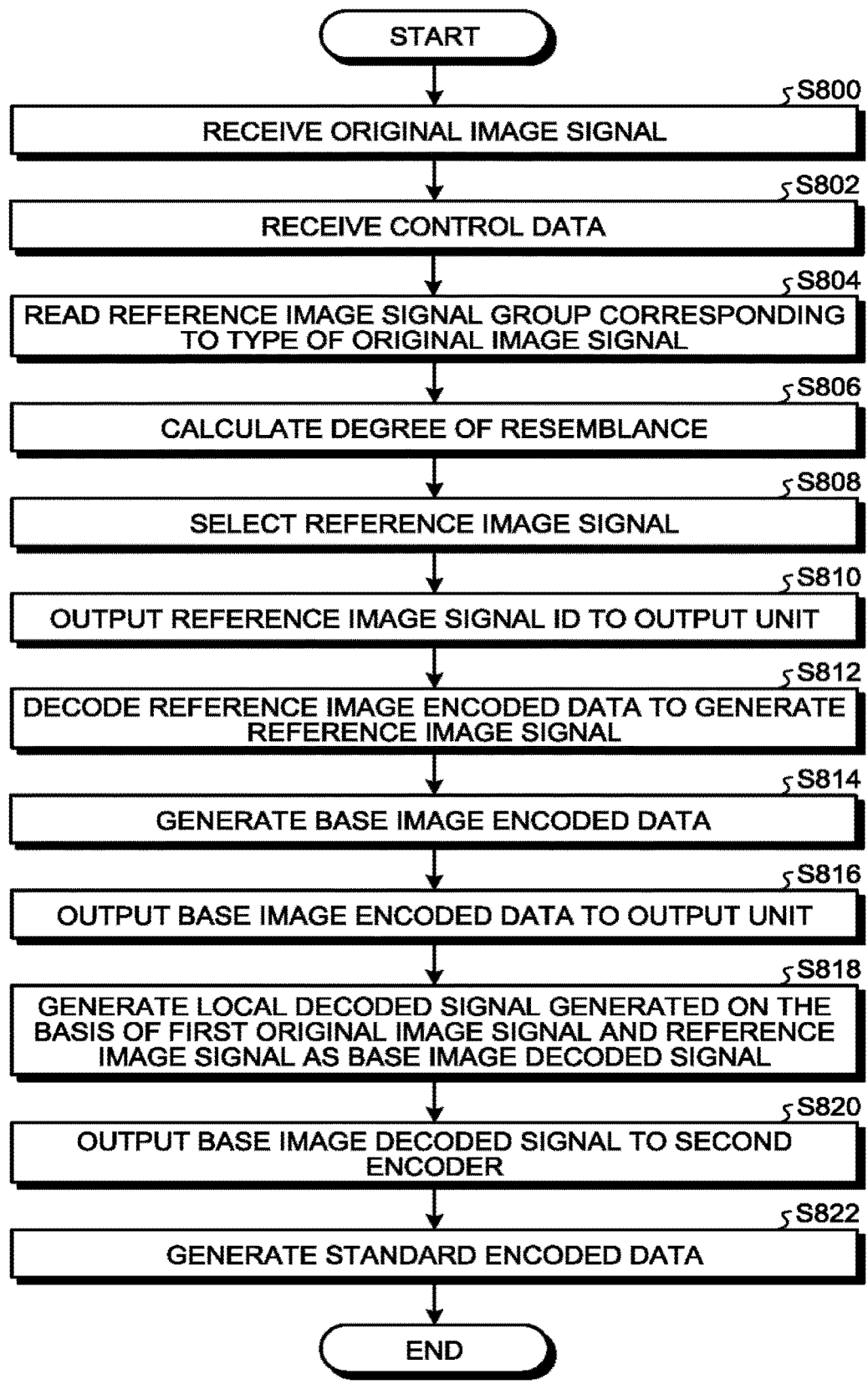
FIG. 13 is a flowchart illustrating procedures of processing carried out by the first encoder and the second encoder.

Next, procedures of processing carried out by the first encoder 11A according to the embodiment will be described. FIG. 13 is a flowchart illustrating the exemplary procedures of the processing carried out by the first encoder 11A.

The first encoder 11A carries out processing from step S800 to step S810 similarly to the processing from step S300 to step S310 (see FIG. 6) carried out by the first encoder 11 according to the first embodiment.

Specifically, the selector 112 first receives the first original image signal from the receiver 17 (step S800). The selector 112 also receives the control data from a controller 16 (step S802).

Next, a degree-of-resemblance calculator 112A of the selector 112 reads, from the reference image management DB 110A, the reference image signal group corresponding to the type of the original image signal including the first original image signal received at step S800 (step S804). Through the processing at step S804, the degree-of-resemblance calculator 112A specifies the reference image signal group corresponding to the type of the original image signal.

Next, the degree-of-resemblance calculator 112A calculates the degree of resemblance between each of the reference image signals included in the reference image signal group read at step S804 and the first original image signal received at step S800 (step S806).

Next, a reference image selector 112B selects the reference image signal of which the degree of resemblance calculated at step S806 is equal to or higher than the threshold, from among the reference image signals read at step S804 (step S808).

Subsequently, the reference image selector 112B adds the reference image signal ID of the reference image signal selected at step S808 to the control data received at step S802 to output to the output unit 15 (step S810).

Next, the fourth generator 116A of the first generator 116 decodes the reference image signal encoded by the intra-frame prediction (reference image encoded data), which has been received from the selector 112 (see FIG. 3), to generate the reference image signal (step S812). Thereafter, the fourth generator 116A outputs the reference image signal to the fifth generator 116B.

Subsequently, the fifth generator 116B of the first generator 116 generates the base image encoded data obtained by encoding the first original image signal received at step S800 by the inter-frame prediction using the reference image signal generated at step S812 (step S814). Then, the fifth generator 116B outputs the generated base image encoded data to the output unit 15 (step S816).

The fifth generator 116B of the first generator 116 also generates the local decoded signal generated on the basis of the first original image signal received at step S800 and the reference image signal generated at step S812 as the base image decoded signal (step S818).

Thereafter, the fifth generator 116B outputs the generated base image decoded signal to the second encoder 12 (step S820). Upon receiving the second original image signal from the receiver 17, the second encoder 12 encodes the second original image signal by the inter-frame prediction using the base image decoded signal generated at step S818 to generate the standard encoded data (step S822) (the standard encoded data is not output to the output unit). Then, this routine is terminated. The reason why the base image decoded signal is encoded by the intra-frame prediction at the second encoder 12 is to generate a reference image for the subsequent encoding timing when the second original image signal is encoded by the inter-frame prediction. Through this processing, it is made possible to generate, at an inverse transformer 22, the same resultant data as that obtained by encoding the base image decoded signal by the intra-frame prediction.

As described thus far, in the encoding apparatus 10A according to the embodiment, the first generator 116 encodes the first original image signal by the inter-frame prediction using the reference image signal to generate the base image encoded data. The first generator 116 also generates the local decoded signal generated on the basis of the first original image signal and the reference image signal as the base image decoded signal. Consequently, the encoding apparatus 10A according to the embodiment can achieve an effect similar to that of the encoding apparatus 10 according to the first embodiment.

Figure 14:
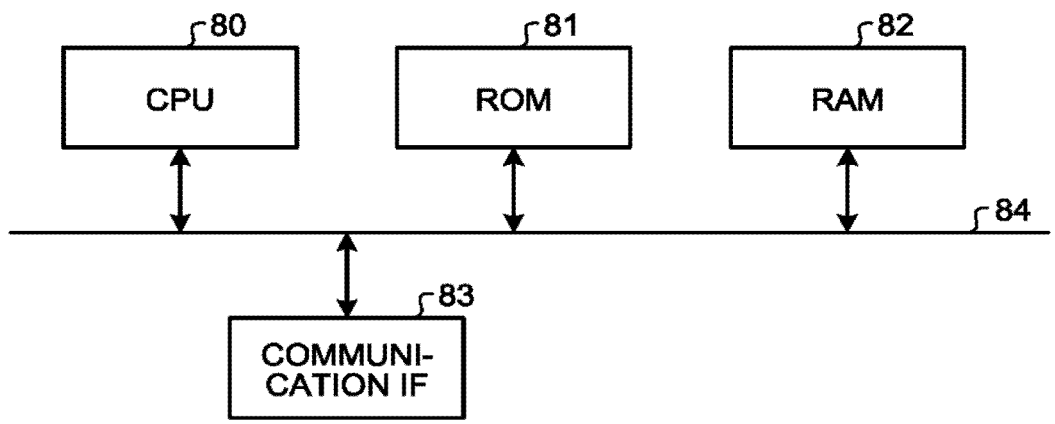
FIG. 14 is a block diagram illustrating a hardware configuration.

Next, a hardware configuration of each of the encoding apparatus 10, the encoding apparatus 10A, and the decoding apparatus 20 described in the embodiments above will be described. FIG. 14 is a block diagram illustrating the hardware configuration of each of the encoding apparatus 10, the encoding apparatus 10A, and the decoding apparatus 20 described in the embodiments above.

Each of the encoding apparatus 10, the encoding apparatus 10A, and the decoding apparatus 20 described in the embodiments above has a hardware configuration utilizing a usual computer, where a communication interface (IF) 83, a CPU 80, a read only memory (ROM) 81, a random access memory (RAM) 82, and so on are interconnected through a bus 84.

The CPU 80 is an operation processing apparatus controlling the entire processing of each of the encoding apparatus 10, the encoding apparatus 10A, and the decoding apparatus 20 described in the embodiments above. The RAM 82 stores data necessary for various types of processing by the CPU 80. The ROM 81 stores a program or the like that implements various types of processing by the CPU 80. The communication interface (IF) 83 is an interface for connecting to an external apparatus via the communication line to transmit and receive data to and from the connected external apparatus.

Note that the program for carrying out the processing performed at each of the encoding apparatus 10, the encoding apparatus 10A, and the decoding apparatus 20 described in the embodiments above is provided by being built in the ROM 81 or the like in advance.

In addition, the program for carrying out the processing performed at each of the encoding apparatus 10, the encoding apparatus 10A, and the decoding apparatus 20 described in the embodiments above may be configured so as to be provided by being recorded in a recording medium readable by a computer, such as a CD-ROM, a flexible disk (FD), a CD-R, and a digital versatile disk (DVD), as a file in a format that allows the installation in the encoding apparatus 10, the encoding apparatus 10A, and the decoding apparatus 20 described in the embodiments above or in a format executable therein.

Meanwhile, the program for carrying out the processing performed at each of the encoding apparatus 10, the encoding apparatus 10A, and the decoding apparatus 20 described in the embodiments above may be configured so as to be stored in a computer connected to a network such as the Internet such that the provision thereof is by way of the download via the network. Furthermore, the program for carrying out the processing performed at each of the encoding apparatus 10, the encoding apparatus 10A, and the decoding apparatus 20 described in the embodiments above may be configured so as to be provided or distributed via a network such as the Internet.

Note that the computer is not limited to a personal computer but includes an operation processing apparatus, a microcontroller, or the like included in an information processing appliance. Namely, the computer is used as a generic name of an appliance and an apparatus capable of implementing the functions according to the embodiments through the program.

The program for carrying out the processing performed at each of the encoding apparatus 10, the encoding apparatus 10A, and the decoding apparatus 20 described in the embodiments above has a module configuration including the aforementioned respective units. The actual hardware is configured such that the CPU 80 reads various types of the programs from the ROM 81 or the like to execute and then, the aforementioned respective units are loaded on a main storage apparatus. Thus, the above-described functional configuration is generated in the main storage apparatus.

Note that the steps indicating the processing procedures described in the embodiments above do not necessarily need to be carried out in the aforementioned order.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoding apparatus comprising:
   a memory that stores one or more reference images corresponding to a first original image signal indicative of a transition of a scene or a random access point; and
   a processor that is connected to the memory, wherein the processor
   receives image signals to be encoded,
   determines whether each of the image signals to be encoded is the first original image signal or a second original image signal,
   generates reference image encoded data by performing intra-frame prediction encoding on one of the reference images read out from the memory,
   generates base image encoded data by performing, using the reference image encoded data, inter-frame prediction encoding on each image signal determined as being the first original image signal out of the image signals to be encoded,
   generates a base image decoded signal by decoding the base image encoded data,
   generates standard encoded data by performing, by using the base image decoded signal, inter-frame prediction encoding on each image signal determined as being the second original image signal out of the image signals to be encoded, and
   outputs, to a decoding apparatus, encoded data including the base image encoded data and the standard encoded data.

2. The encoding apparatus according to claim 1, wherein the standard encoded data and the base image encoded data are P-pictures or B-pictures.

3. The encoding apparatus according to claim 1, wherein the processor
   decodes the reference image encoded data and the base image encoded data to generate a decoded image signal of the base image encoded data as a base image decoded signal, and
   performs the generation of the standard encoded data by using the decoded image signal.

4. The encoding apparatus according to claim 1, wherein the processor
   selects, from the memory, one of the reference images of which the degree of resemblance to the first original image signal is equal to or higher than a threshold, and
   generates the base image encoded data by performing, using the selected one of the reference images, inter-frame prediction encoding on the image signal determined as being the first original image signal.

5. The encoding apparatus according to claim 4, wherein the processor selects a reference image signal having the degree of resemblance equal to or higher than the threshold from among reference image signals corresponding to a type of the image signal to be processed.

6. The encoding apparatus according to claim 4, wherein the processor generates the base image encoded data by performing, using a selected reference image signal, inter-frame prediction encoding on the image signal determined as being the first original image signal, while generating a local decoded signal generated on the basis of the first original image signal and the reference image signal as the base image decoded signal.

7. The encoding apparatus according to claim 1, wherein the processor outputs transmission information including the encoded data including the base image encoded data and the standard encoded data.

8. A decoding apparatus comprising:
   a processor that
   receives transmission information including the encoded data output by the encoding apparatus according to claim 1,
   performs inverse transformation by performing intra-frame prediction encoding of a base image decoded signal obtained by decoding the base image encoded data included in the encoded data by using a reference image signal used in the encoding of the base image encoded data to generate the standard encoded data, and
   decodes the standard encoded data.

9. The decoding apparatus according to claim 8, wherein
the transmission information includes the encoded data and transmission control data including reference image signal identification information of a reference image signal used during the generation of the base image encoded data, and the processor decodes the base image encoded data to the base image decoded signal by using the reference image signal identified by the reference image signal identification information.

10. An image processing system comprising
the encoding apparatus according to claim 1; and
a processor that
receives transmission information including the encoded data output by the encoding apparatus according to claim 1,
performs inverse transformation by performing intra-frame prediction encoding of a base image decoded signal obtained by decoding the base iamge encoded data included in the encoded data to generate the standard encoded data, and
decodes the standard encoded data.

11. The encoding apparatus according to claim 1, wherein the encoding apparatus outputs the base image encoded data and the standard encoded data without outputting reference image encoding data.

* * * * *